United States Patent
Andreas

(10) Patent No.: US 10,449,984 B2
(45) Date of Patent: Oct. 22, 2019

(54) SPACE-SAVING LOADING EQUIPMENT

(71) Applicant: American Sterilizer Company, Mentor, OH (US)

(72) Inventor: Michael Walton Andreas, Newbury, OH (US)

(73) Assignee: AMERICAN STERILIZER COMPANY, Mentor, OH (US)

( * ) Notice: Subject to any disclaimer, the term of this patent is extended or adjusted under 35 U.S.C. 154(b) by 0 days.

(21) Appl. No.: 14/685,645

(22) Filed: Apr. 14, 2015

(65) Prior Publication Data

US 2016/0304109 A1 Oct. 20, 2016

(51) Int. Cl.
*B65G 69/00* (2006.01)
*B62B 3/02* (2006.01)
*B65G 65/00* (2006.01)

(52) U.S. Cl.
CPC ............. *B62B 3/02* (2013.01); *B65G 65/00* (2013.01); *B62B 2202/90* (2013.01); *B62B 2203/74* (2013.01); *B62B 2206/02* (2013.01)

(58) Field of Classification Search
CPC .................................................. B65G 69/005
USPC ....................................... 414/396, 401, 402
See application file for complete search history.

(56) References Cited

U.S. PATENT DOCUMENTS

| | | | |
|---|---|---|---|
| 3,261,650 A | 7/1966 | Stromqvist | 312/236 |
| 3,869,052 A | 3/1975 | Leahy | 214/38 B |
| 3,905,662 A | 9/1975 | Richmond | 312/250 |
| 5,072,960 A | 12/1991 | Sperko | 280/47.34 |
| 5,224,812 A | 7/1993 | Oslin et al. | 414/331 |
| 5,360,307 A * | 11/1994 | Schemm | B60K 1/04 104/34 |
| 5,476,282 A | 12/1995 | Dahl | 280/651 |
| 5,553,986 A | 9/1996 | Napierkowski et al. | 414/401 |
| 5,570,988 A * | 11/1996 | Gallaway | B62B 5/0003 414/343 |
| 5,795,115 A * | 8/1998 | Collins | B60P 3/075 410/19 |
| 6,036,219 A | 3/2000 | Oefelein et al. | 280/638 |
| 7,712,184 B1 * | 5/2010 | Lewis | B60B 33/0039 16/18 R |

* cited by examiner

*Primary Examiner* — Saul Rodriguez
*Assistant Examiner* — Willie Berry, Jr.
(74) *Attorney, Agent, or Firm* — Kusner & Jaffe

(57) ABSTRACT

An apparatus for loading and unloading a cart into and from a chamber of a housing. The apparatus is movable between a first, collapsed configuration and a second, expanded configuration. The apparatus includes a user portion and a chamber portion engagable with the housing. The chamber portion is movable relative to the user portion. An attachment assembly selectively attaches the apparatus to the housing. At least one cart locking device selectively locks the cart to the apparatus. When the at last one cart locking device locks the cart to the apparatus, the cart is removed from the chamber when the apparatus moves from the first, collapsed configuration to the second, expanded configuration. The cart is inserted into the chamber when the apparatus moves from the second, expanded configuration to the first, collapsed configuration.

12 Claims, 14 Drawing Sheets

SPACE-SAVING LOADING EQUIPMENT

FIELD OF THE INVENTION

The present invention relates generally to an apparatus for use with a cart for holding articles. The invention is particularly applicable for use in inserting/removing a device cart into/out of a chamber of a washer or sterilizer. It being appreciated, however, that the present invention finds advantageous application for inserting/removing other structures into/from a chamber.

BACKGROUND OF THE INVENTION

Device carts are used within medical facilities for holding objects, such as medical instruments and devices while the objects are cleaned or disinfected in a washer or sterilizer. The device cart often includes several shelves for holding the objects thereon. During use, a plurality of objects is placed on the device cart and the device cart is inserted into a chamber of the washer or sterilizer. After the objects have been cleaned or disinfected, the device cart is removed from the chamber. In some instances, the device cart serves as an apparatus for conveniently transporting the objects throughout the facility.

Conventionally, transfer carriages are used to transport the device carts within the facility. In some instances, removing the device cart from the washer or sterilizer requires that the user lift the device cart and place it on the transfer carriage. Some device carts are designed to roll onto the transfer carriage from the washer or sterilizer. However, such designs often require the user to reach into the chamber and pull the cart out of the chamber. Such a motion by the user tends to stress the back of the user, thereby increasing the likelihood that the user will be injured. When loading the device cart into the chamber, the user often must stand next to the transfer carriage and use their arms to push the device cart into the washer or sterilizer. Such a motion tends to further increase the stress on the back and arms of the user, particular in instances wherein the device cart is fully loaded with objects. The aforementioned stresses on the user increase significantly as the device carts increase in size and weight.

When the transfer carriage is not in use, the transfer carriage must be stored. However, conventional transfer carriages are long and bulky and tend to require an excessive amount of floor space. The medical facility usually has limited floor space, thereby making the storage of multiple transfer carriages problematic. The foregoing issue becomes even more problematic as transfer carriages become larger to accommodate larger device carts.

The present invention overcomes these and other problems and provides a space-saving apparatus for inserting/removing a device cart into/from a chamber.

SUMMARY OF THE INVENTION

In accordance with a preferred embodiment of the present invention, there is provided an apparatus for loading and unloading a cart into and from a chamber of a housing. The apparatus is movable between a first, collapsed configuration and a second, expanded configuration. The apparatus includes a user portion and a chamber portion engagable with the housing. The user portion and the chamber portion are movable relative to each other. An attachment assembly selectively attaches the apparatus to the housing. At least one cart locking device selectively locks the cart to the apparatus. When the at last one cart locking device locks the cart to the apparatus, the cart is removed from the chamber when the apparatus moves from the first, collapsed configuration to the second, expanded configuration. The cart is inserted into the chamber when the apparatus moves from the second, expanded configuration to the first, collapsed configuration.

In accordance with another embodiment of the present invention, there is provided a method for removing a cart from a chamber of a housing. The method including steps of:
a) providing an apparatus having a chamber portion and a user portion that are movable relative to each other in a telescopic manner, wherein a size of the apparatus is minimized when the apparatus is in a first, collapsed configuration and the size of the apparatus is maximized when the apparatus is in a second, expanded configuration;
b) locking the chamber portion of the apparatus to the housing when the apparatus is in the first, collapsed configuration;
c) securing the cart to the user portion of the apparatus when the cart is at least partially disposed on the apparatus; and
d) expanding the apparatus from the first, collapsed configuration to the second, expanded configuration such that the cart is withdrawn from the chamber and rests on the apparatus when the apparatus is in the second, expanded configuration.

An advantage of the present invention is the provision of an apparatus for inserting and removing a device cart into and out of a chamber.

A still further advantage of the present invention is an apparatus as described above that is simple in construction.

A still further advantage of the present invention is an apparatus as described above wherein a user does not have to lift a device cart onto the apparatus.

Another advantage of the present invention is an apparatus as described above that is movable between a first, collapsed configuration and a second, expanded configuration.

A still further advantage of the present invention is an apparatus as described above that allows a user to easily change the apparatus between the first, collapsed configuration and the second, expanded configuration.

Another advantage of the present invention is an apparatus as described above wherein the first, collapsed configuration allows for easy storage of the apparatus.

Still another advantage of the present invention is an apparatus as described above that aids a user in removing a device cart from a chamber as the apparatus moves from the first, collapsed configuration to the second, expanded configuration.

Yet another advantage of the present invention is an apparatus as described above that aids a user in inserting a device cart into a chamber as the apparatus moves from the second, expanded configuration to the first, collapsed configuration.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
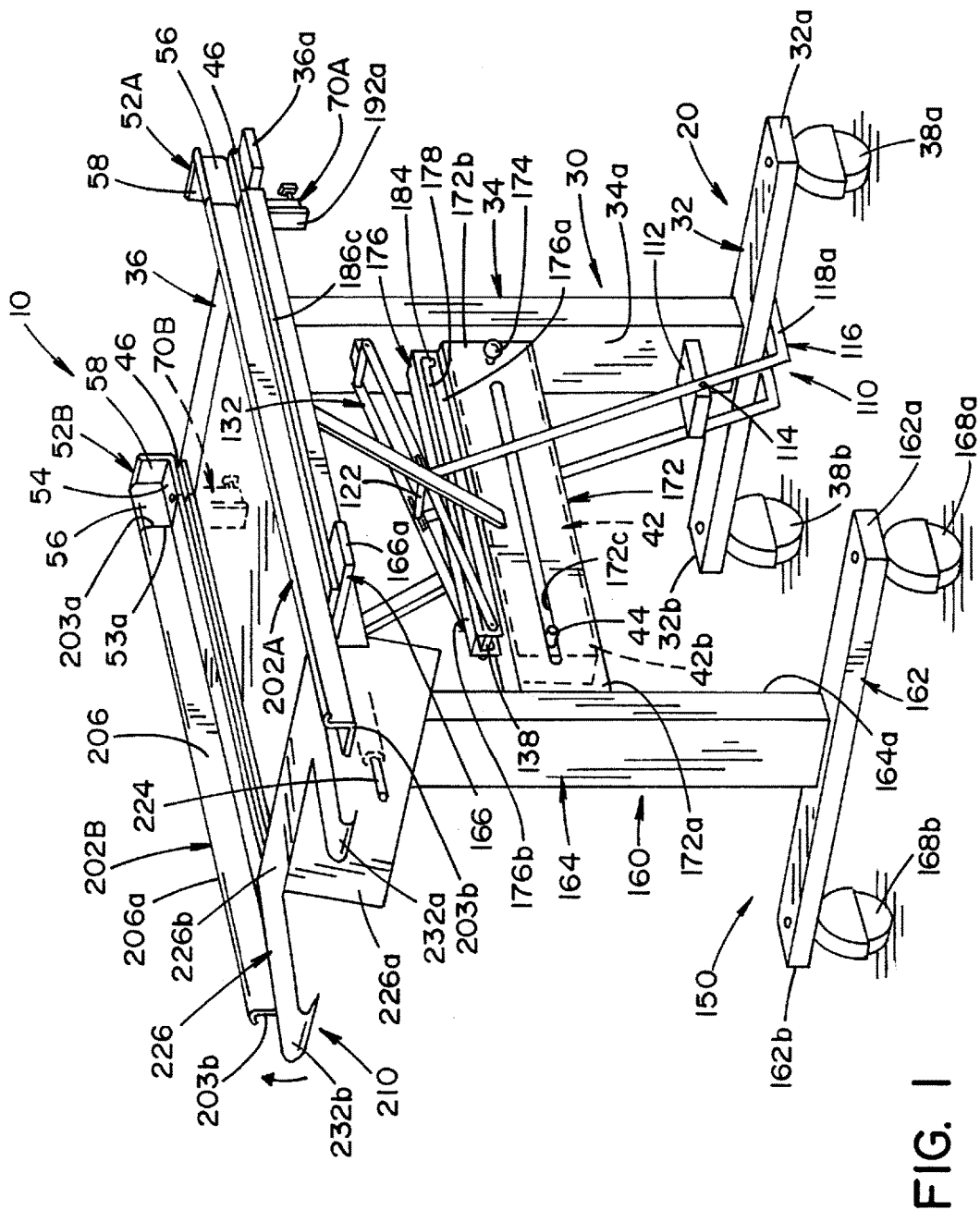
FIG. 1 is a perspective view of a transfer carriage, illustrating a preferred embodiment of the present invention in a first, collapsed configuration.

Referring now to the drawings wherein the showings are for the purpose of illustrating a preferred embodiment of the invention only and not for the purpose of limiting the same, FIG. 1 shows a transfer carriage 10 illustrating a preferred embodiment of the present invention. Transfer carriage 10 will be described with respect to inserting/removing a device cart 250 into/from a chamber 6 of a washer or sterilizer 4. However, as can be appreciated from a reading of the present application, the present invention is not limited to use with washer or sterilizer 4 or device cart 250. For example, the present invention may be used to insert or remove objects, e.g., containers, trays, etc., into or from a chamber of an apparatus, e.g., a freezer, a refrigerator, etc.

In general, transfer carriage 10 includes two (2) telescoping sections, namely first section 20 and second section 150, a foot actuation assembly 110 and an attachment assembly 210. First section 20 is also referred to as the "user portion" of transfer carriage 10. Second section 150 is also referred to as the "chamber portion" of transfer carriage 10. First section 20 and second section 150 are movable relative to each other to allow transfer carriage 10 to be selectively placed in a first, collapsed configuration and a second, expanded configuration, as explained in detail below.

Figure 2:
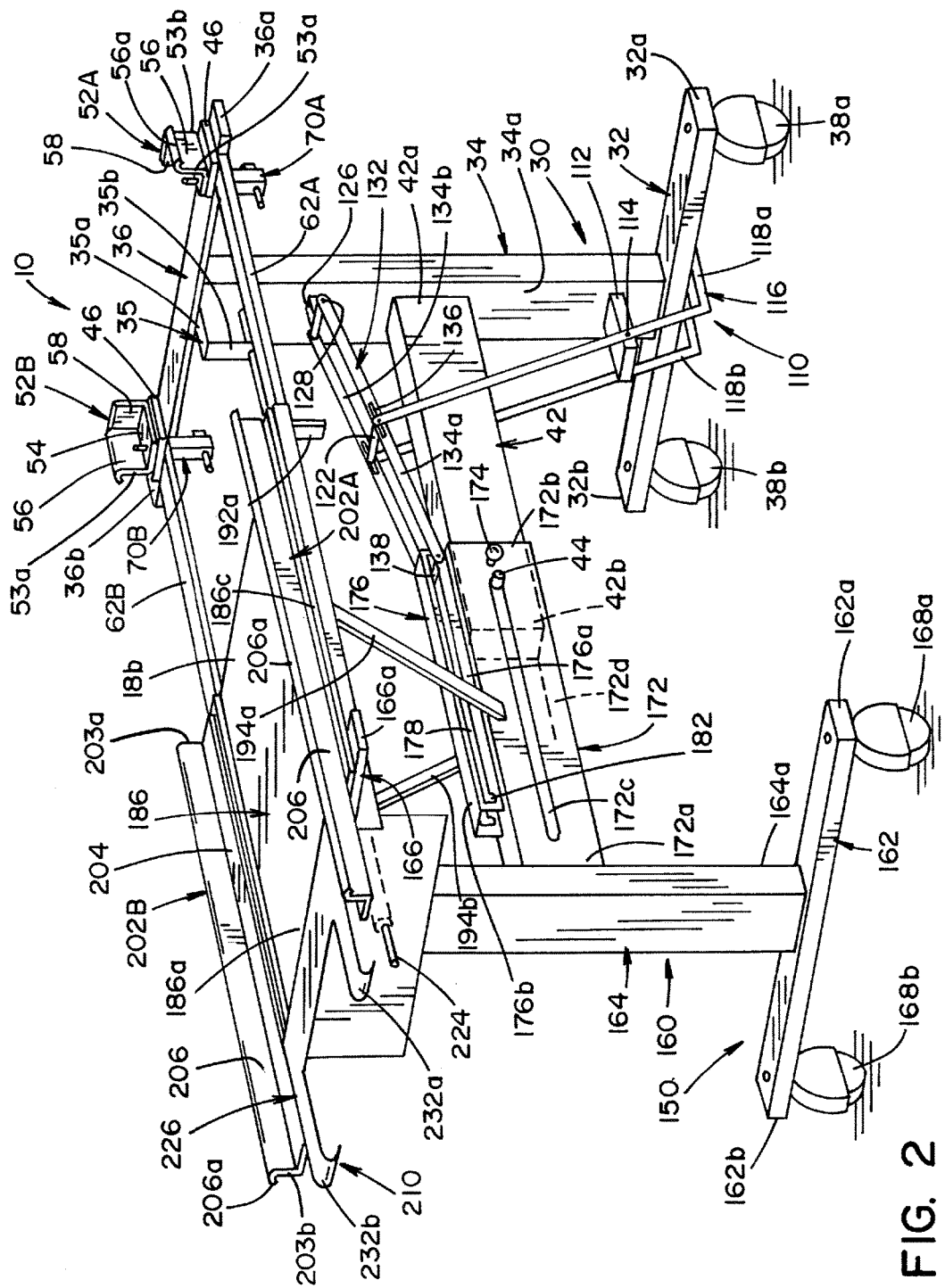
FIG. 2 is a perspective view of the transfer carriage shown in FIG. 1, illustrating the present invention in a second, expanded configuration.
Figure 3:
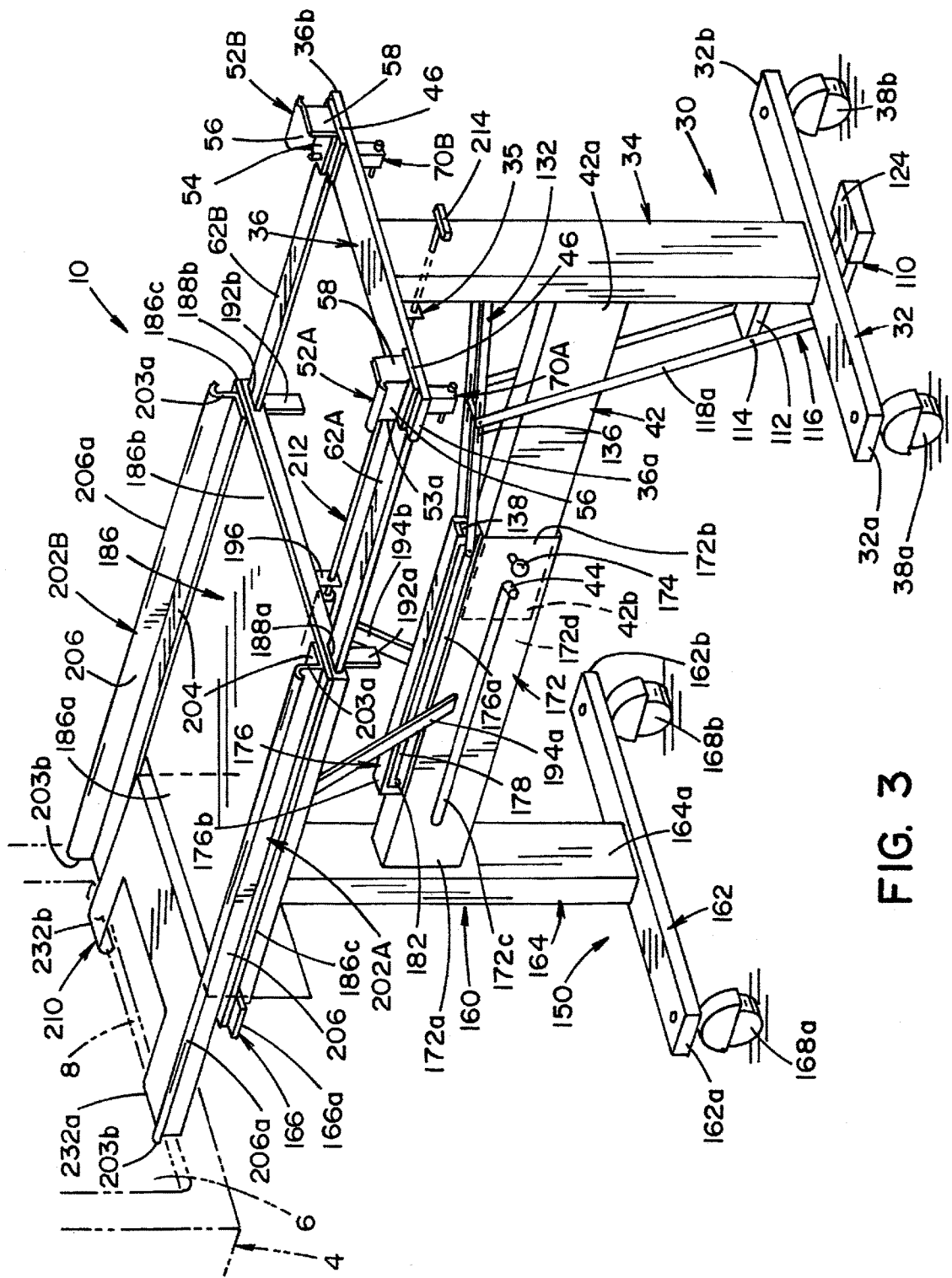
FIG. 3 is a perspective view of the transfer carriage shown in FIG. 2, illustrating the transfer carriage attached to a housing of a washer or sterilizer.

Referring now to FIGS. 1-3, first section 20 and second section 150 of transfer carriage 10 are best seen. In general, first section 20 includes a frame assembly 30, end rails 52A, 52B, slides 62A, 62B, a first wheel lock assembly 70A and a second wheel lock assembly 70B.

Frame assembly 30 is a generally I-shaped assembly that includes a base member 32, a vertical member 34 and a top member 36. In the embodiment shown, base member 32 is a generally flat, rectangular-shaped element. Two (2) wheels 38a, 38b are attached to a bottom of base member 32. One wheel 38a is disposed at a first end 32a of base member 32. Another wheel 38b is disposed at a second end 32b of base member 32. Wheels 38a, 38b aid a user in being able to easily move transfer carriage 10 within a facility.

Vertical member 34 extends in a generally vertical direction from a mid portion of base member 32. One surface 34a of vertical member 34 is oriented toward a center of transfer carriage 10. It is contemplated that vertical member 34 may be attached to base member 32 by conventional attachment methods, such as by welding or with fasteners. A hole (not shown) extends through an upper end of vertical member 34. The hole is positioned and dimensioned as described in detail below. In the embodiment shown, vertical member 34 is a tubular-shaped element having a rectangular cross section. It is contemplated that vertical member 34 may be solid.

An L-shaped bracket 35, best seen in FIG. 2, is attached to an upper end of vertical member 34. Bracket 35 includes a horizontal leg portion 35a and a vertical leg portion 35b. A hole (not shown) extends through vertical leg portion 35b of bracket 35. The hole in bracket 35 is dimensioned as described in detail below. An end of horizontal leg portion 35a of bracket 35 is attached to surface 34a of vertical member 34. Bracket 35 is positioned on vertical member 34 such that the hole in vertical portion 35b of bracket 35 aligns with the hole in the upper end of vertical member 34.

Referring now to FIGS. 1-3, a beam member 42 extends from a mid portion of vertical member 34. Beam member 42 is an elongated element having a first end 42a and a second end 42b. A pin 44 extends outward from a side of beam member 42. Pin 44 is disposed near second end 42b of beam member 42. Beam member 42 has an outer shape that is dimensioned as described in detail below. In the embodiment shown, beam member 42 has a rectangular cross-section. It is contemplated that beam member 42 may be solid or tubular in shape. First end 42a of beam member 42 is attached to vertical member 34. Beam member 42 is oriented to extend from surface 34a of vertical member 34 toward the center of transfer carriage 10. It is contemplated that first end 42a may be joined to vertical member 34 by fasteners or by welding.

Top member 36 is attached to an upper end of vertical member 34. Top member 36 is a generally flat, rectangular-shaped element having a first end 36a and a second end 36b. Holes 36c (best seen in FIGS. 12 and 13) extend through top member 36. One hole 36c is disposed near first end 36a and another hole 36c is disposed near second end 36b. Each hole 36c is positioned and dimensioned as described in detail below. It is contemplated that top member 36 may be attached to vertical member 34 by conventional attachment methods, such as by welding or with fasteners.

Referring again to FIGS. 1-3, base member 32 and top member 36 are attached to vertical member 34 such that first end 36a of top member 36 and first end 32a of base member 32 extend toward a first side of transfer carriage 10. In addition, second end 36b of top member 36 and second end 32b of base member 32 extend toward a second side of transfer carriage 10. In the embodiment shown, base member 32 and top member 36 are oriented to be parallel with each other. Base member 32, vertical member 34 and top member 36 define a first end of transfer carriage 10.

Two (2) spacers 46 are disposed on a top surface of top member 36. One spacer 46 is disposed near first end 36a of top member 36. Another spacer 46 is disposed near second end 36b of top member 36. A hole 46a (best seen in FIGS. 12 and 13) extends through each spacer 46. Spacers 46 are positioned such that hole 46a in each spacer 46 aligns with a corresponding hole 36c in top member 36. Holes 46a in spacers 46 are dimensioned as described in detail below. It is contemplated that spacers 46 are joined to top member 36 by conventional attachment means such as fasteners or by welding. In the embodiment shown, each spacer 46 is a generally rectangular-shaped element.

Referring now to FIGS. 1-3, end rails 52A, 52B are disposed on a top surface of each spacer 46. End rails 52A, 52B are essentially mirror images of each other and only end rail 52A will be described in detail. End rail 52A has a first end 53a and a second end 53b and includes a bottom wall 54, a side wall 56 and an end wall 58. Bottom wall 54 is generally rectangular in shape. A hole 54c (best seen in FIGS. 12 and 13) extends through bottom wall 54. Hole 54c is dimensioned as described in detail below.

Referring now to FIGS. 1-3, side wall 56 extends along one edge of bottom wall 54 between first end 53a and second end 53b of end rail 52A. A flange 56a extends outwardly from an upper end of side wall 56. In the embodiment shown, flange 56a is curved such that side wall 56 and flange 56a have an inverted "J" shape. End wall 58 is attached to second end 53b of end rail 52A. End wall 58 is a generally rectangular element having a side edge that is attached to side wall 56 and a bottom edge that is attached to bottom wall 54.

End rail 52A is positioned on one spacer 46 such that first end 53a of end rail 52A is oriented toward the center of transfer carriage 10 and flange 56a on side wall 56 extends outwardly from a respective side of transfer carriage 10. In addition, end rail 52A is positioned on spacer 46 such that hole 54c aligns with hole 46a in spacer 46. In the embodiment shown, spacer 46 and end rail 52A are shown as two different components. However, it is contemplated that spacer 46 and end rail 52A may be integrally formed as one component without taking from the present invention.

Referring now to FIGS. 2 and 3, slides 62A, 62B extend from a side of top member 36. Slides 62A, 62B are elongated, bar-shaped objects. In the embodiment shown, slides 62A, 62B have a rectangular cross section. Slide 62A is disposed near first end 36a of top member 36 and slide 62B is disposed near second end 36b of top member 36. Slides 62A, 62B extend toward a center of transfer carriage 10. Slides 62A, 62B are dimensioned and positioned as described in detail below.

Figure 12:
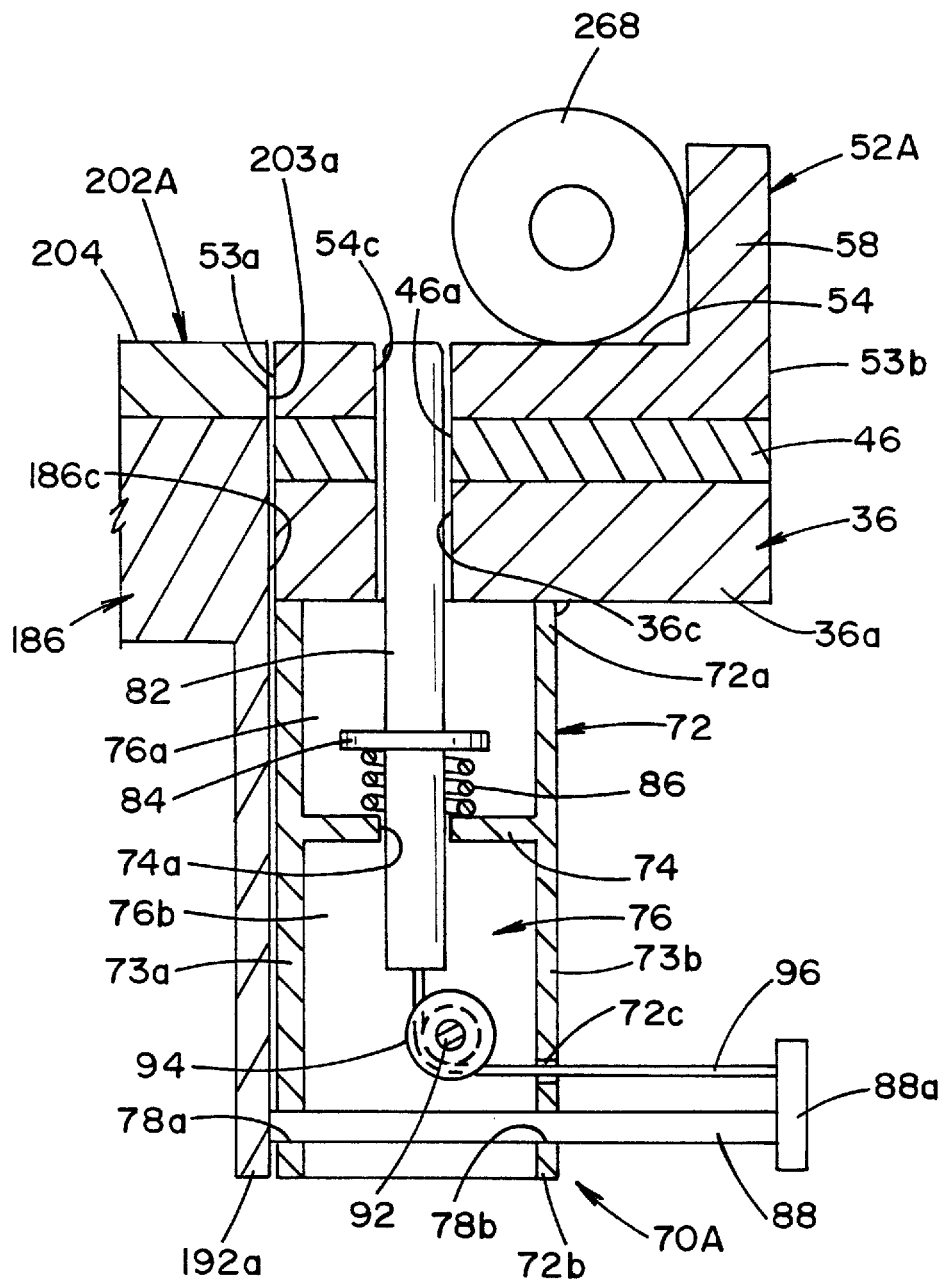
FIG. 12 is a side, sectional view of a wheel look assembly of the transfer carriage showing the wheel lock assembly in an unlocked position.
Figure 13:
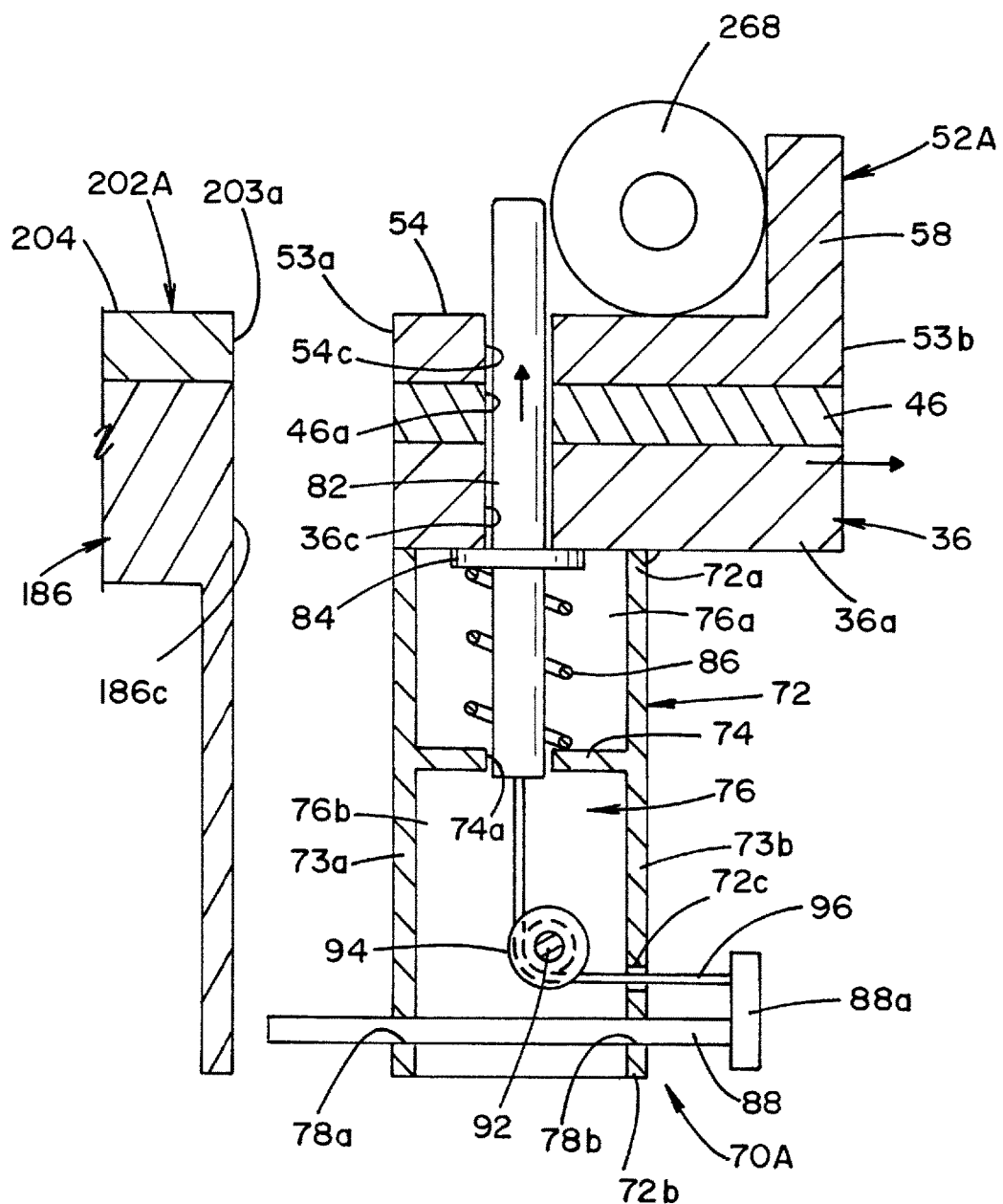
FIG. 13 is a side, sectional view of the wheel lock assembly of FIG. 12 showing the wheel lock assembly in a locked position.

First wheel lock assembly 70A is attached to a bottom surface of top member 36 at first end 36a. Second wheel lock assembly 70B is attached to a bottom surface of top member 36 at second end 36b. First wheel lock assembly 70A and second wheel lock assembly 70B are essentially identical and only first wheel lock assembly 70A will be described in detail below. As best seen in FIGS. 12 and 13, first wheel lock assembly 70A generally includes a housing 72, a pin 82, a biasing element 86, a rod 88 and a cable 96.

Housing 72 is a generally tubular element having a first end 72a attached to a bottom surface of top member 36. A second end 72b of housing 72 is open. Housing 72 defines an inner cavity 76 therein. In the embodiment shown, housing 72 has a generally rectangular cross section with a first wall 73a and an opposite second wall 73b wherein first wall 73a faces the interior of transfer carriage 10. However, it is contemplated that housing 72 may have any other cross section, such as circular, rectangular, etc., without taking from the present invention. A hole 72c extends through a wall of housing 72 near second end 72b. Hole 72c is positioned and dimensioned as described in detail below. In the embodiment shown, hole 72c extends through a lower end of second wall 72b.

A plate 74 extends across inner cavity 76 and divides inner cavity 76 of housing 72 into an upper cavity 76a and a lower cavity 76b. A hole 74a extends through plate 74. Hole 74a is dimensioned and positioned as described in detail below.

Holes 78a, 78b extend through housing 72 near second end 72b of housing 72 at a location below hole 72c. Hole 78a is extends through first wall 73a. Hole 78b extends through second wall 73b. Holes 78a, 78b are aligned with each other and are dimensioned as described in detail below.

Pin 82 extends through hole 74a in plate 74 of housing 72. Pin 82 is dimensioned to slide within hole 74a. A washer 84 is disposed on pin 82 near a mid portion of pin 82. Biasing element 86 is disposed around pin 82 and is positioned between washer 84 and a lower end of pin 82.

Rod 88 extends through holes 78a, 78b in housing 72. Rod 88 includes a head portion 88a. Head portion 88a is disposed at one end of rod 88. Rod 88 extends through holes 78a, 78b such that head portion 88a is disposed outside of inner cavity 76 of housing 72.

An axle 92 extends through lower cavity 76b of housing 72. In the embodiment shown, axle 92 is a cylindrical rod that extends between opposite walls of housing 72. A roller 94 is disposed on axle 92 to freely rotate thereon.

Cable 96 is attached at one end to a bottom portion of pin 82 and at another end to head portion 88a of rod 88. As shown in FIG. 12, cable 96 engages an outer surface of roller 94 and passes through hole 72c in second wall 73b of housing 72.

Housing 72 of first wheel lock assembly 70A is attached to the bottom surface of top member 36 such that pin 82 is captured between plate 74 of housing 72 and the bottom surface of top member 36. Hole 74a in plate 74, hole 36c in top member 36, hole 46a in spacer 46 and hole 54c in end rail 52A are all positioned to align with each other and are dimensioned to allow pin 82 to extend therethrough. Pin 82 is movable between a first, locked position, as shown in FIG. 13, and a second, unlocked position, as shown in FIG. 12.

Referring now to FIG. 13, first wheel lock assembly 70A in a first, locked position is best seen. Biasing element 86 is disposed on pin 82 between washer 84 on pin 82 and a top surface of plate 74 of housing 72. Biasing element 86 is dimensioned to apply a force to a bottom of washer 84 to bias pin 82 into the first, locked position. When pin 82 is in the first, locked position, an upper end of pin 82 extends beyond the top surface of bottom wall 54 of end rail 52A. Washer 84 on pin 82 engages a bottom surface of top member 36 to limit how far the upper end of pin 82 may extend beyond the top surface of bottom wall 54 of end rail 52A. Cable 96 of first wheel lock assembly 70A is dimensioned such that, when pin 82 is in the locked position, cable 96 exerts a force on head portion 88a of rod 88 thereby drawing head portion 88a to a first distance from second wall 73b of housing 72. Rod 88 is dimensioned such that, when head portion 88a is the first distance from second wall 73b, a distal end of rod 88 extends through hole 78a to a position beyond the outer surface of first wall 73a of housing 72.

Referring now to FIG. 12, first wheel lock assembly 70A in the second, unlocked position is best seen. Rod 88 is dimensioned such that, when the distal end of rod 88 is essentially even with the outer surface of first wall 73a, head portion 88a is disposed a second distance from second wall 73b of housing 72. As shown in FIGS. 12 and 13, the second distance is greater than the first distance. As head portion 88a moves to the second position, head portion 88a applies a force to cable 96. Cable 96 is dimensioned such that cable 96 draws pin 82 in a downward direction, thereby compressing biasing element 86 between washer 84 and plate 74. Pin 82 is dimensioned such that, when head portion 88a is the second distance from second wall 73b, the upper end of pin 82 is disposed even with or below the upper surface of bottom wall 54 of end rail 52A.

Referring now to FIGS. 1-3, second section 150 of transfer carriage 10 is best seen. Second section 150, in general, includes a frame assembly 160 and side rails 202A, 202B.

Frame assembly 160 is a generally I-shaped assembly that includes a base member 162, a vertical member 164 and a top member 166. In the embodiment shown, base member 162 is a generally flat, rectangular-shaped element. Two (2) wheels 168a, 168b are attached to a bottom of base member 162. One wheel 168a is disposed at a first end 162a of base member 162. Another wheel 168b is disposed at a second end 162b of base member 162. Wheels 168a, 168b aid a user in being able to easily move transfer carriage 10 within a facility.

Vertical member 164 extends in a generally vertical direction from a mid portion of base member 162. One surface 164a of vertical member 164 is oriented toward a center of transfer carriage 10. It is contemplated that vertical member 164 may be attached to base member 162 by conventional attachment methods, such as by welding or by fasteners. In the embodiment shown, vertical member 164 is a tubular-shaped element having a rectangular cross section. It is contemplated that vertical member 164 may also be solid.

A receiving channel 172 extends from a mid portion of vertical member 164. Receiving channel 172 is an elongated tubular-shaped element having a first end 172a and a second end 172b. A slot 172c is formed in a side wall of receiving channel 172. Slot 172c extends generally parallel to a longitudinal axis of receiving channel 172. Receiving channel 172 defines an inner cavity 172d that is dimensioned as described in detail below. In the embodiment shown, receiving channel 172 has a rectangular cross-section. First end 172a of receiving channel 172 is attached to surface 164a of vertical member 164 such that receiving channel 172 extends toward the center of transfer carriage 10. It is contemplated that first end 172a may be joined to vertical member 164 by fasteners or by welding.

A locking screw 174 extends through a hole in one side wall of receiving channel 172. Locking screw 174 is disposed near second end 172b of receiving channel 172.

A C-shaped bracket 176 is attached to a top surface of receiving channel 172. C-shaped bracket 176 has two (2) downward facing legs 176a and a base portion 176b. An elongated slot 178 is formed in each leg 176a. Slots 178 extend in a direction generally parallel to the longitudinal axis of C-shaped bracket 172. Slots 178 are dimensioned as described in detail below. A first notch 182 is formed in one end of each slot 178. Each first notch 182 extends in a generally downward direction. A second notch 184 is formed in the second end of each slot 178. Each second notch 184 extends in a generally downward direction.

Legs 176a of C-shaped bracket 176 are attached to a top surface of receiving channel 172. C-shaped bracket 176 is positioned on receiving channel 172 to align with a longitudinal axis of receiving channel 172. In particular, the first end of bracket 176 is disposed toward first end 172a of receiving channel 172 and the second end of bracket 176 is disposed toward second end 172b of receiving channel 172. As such, first notches 182 in slots 178 are disposed near first end 172a of receiving channel 172 and second notches 184 in slots 178 are disposed near second end 172b of receiving channel 172.

Top member 166 is attached to an upper end of vertical member 164. Top member 166 is a generally flat, rectangular-shaped element. It is contemplated that top member 166 may be attached to vertical member 164 by conventional attachment methods, such as by welding or with fasteners.

A first end 166a of top member 166 and first end 162a of base member 162 extend toward a first side of transfer carriage 10. A second end 166b of top member 166 and second end 162b of base member 162 extend toward a second side of transfer carriage 10. In the embodiment shown, base member 162 and top member 166 are oriented to be parallel with each other. Base member 162, vertical member 164 and top member 166 define a second end of transfer carriage 10.

A plate 186 is attached to a top surface of top member 166. Plate 186 is a generally flat, rectangular-shaped element having a first end 186a, a second end 186b and two (2) long edges 186c extending between first end 186a and second end 186b. A notch (not shown) is formed in a bottom surface of plate 186 along first end 186a. Openings 188a, 188b extend longitudinally into second end 186b of plate 186. One opening 188a is disposed near one long edge 186c of plate 186. Another opening 188b is disposed near the other long edge 186c of plate 186. Openings 188a, 188b are dimensioned and positioned as described in detail below.

Plate 186 is attached to a top surface of top member 166 such that top member 166 is disposed in the notch (not shown) formed in the bottom surface of first end 186a of plate 186. It is contemplated that plate 186 may be attached to top member 166 by conventional means, such as by fasteners or by welding.

Tabs 192a, 192b extend downwardly from the bottom of plate 186 at second end 186b of plate 186. One tab 192a is disposed near one long edge 186c of plate 186. Another tab 192b is disposed near the other long edge 186c of plate 186. Tabs 192a, 192b are dimensioned and positioned as described in detail below. Tabs 192a, 192b are generally rectangular-shaped plates that are attached to the bottom of plate 186.

Braces 194a, 194b are attached to plate 186. A first end of each brace 194a, 194b is attached to a bottom surface of plate 186. A second end of each brace 194a, 194b is attached to opposite side walls of receiving channel 172. It is contemplated that braces 194a, 194b may be attached to plate 186 and receiving channel 172 by conventional means, such as by fasteners or by welding.

A tab 196 is attached to a lower surface of plate 186. A hole (not shown) extends through tab 196. Tab 196 is disposed near second end 186b of plate 186 at a location near a midpoint between long edges 186c. Tab 196 and the hole therein are dimensioned and positioned as described in detail below.

Side rails 202A, 202B are disposed on a top surface of plate 186. Side rails 202A, 202B are essentially mirror images of each other and only side rail 202A will be described in detail. Side rail 202A has a first end 203a and a second end 203b. Side rail 202A includes a bottom wall 204 and a side wall 206. Bottom wall 204 is generally rectangular in shape. Side wall 206 extends in an upward direction from an outer edge of bottom wall 204 between first end 203a and second end 203b. A flange 206a extends outwardly from an upper end of side wall 206. In the embodiment shown, flange 206a is a curved-shaped element such that side wall 206 has an inverted "J" shape. Side rail 202A is positioned on plate 186 such that first end 203a of side rail 202A is oriented toward the center of transfer carriage 10 and flange 206a on side wall 206 extends outwardly from a respective side of transfer carriage 10. Side rail 202A is disposed on the first side of transfer carriage 10 and side rail 202B is disposed on the second side of transfer carriage 10.

As shown in FIGS. 1-3, first section 20 of transfer carriage 10 is dimensioned to engage second section 150 of transfer carriage 10. In particular, first section 20 and second section 150 are dimensioned to move in a telescoping manner. As shown in FIG. 1, receiving channel 172 of second section 150 is dimensioned to receive beam member 42 of first section 20. Inner cavity 172d of receiving channel 172 is dimensioned to allow beam member 42 of first section 20 to slide freely therein. Pin 44 on beam member 42 is dimensioned to be disposed within slot 172c of receiving channel 172. Slot 172c of receiving channel 172 is dimensioned to allow pin 44 to slide free therein. Locking screw 174 on receiving channel 172 is dimensioned to engage an outer surface of beam member 42 to allow a user to lock beam member 42 into a predetermined position relative to receiving channel 172.

First section 20 and second section 150 are attached such that first end 203a of side rail 202A of second section 150 and first end 53a of end rail 52A of first section 20 align with each other. Similarly, first end 203a of side rail 202B of second section 150 and first end 53a of end rail 52B of first section 20 align with each other. Tabs 192a, 192b of second section 150 are dimensioned and positioned to align with the distal end of rod 88 of first wheel lock assembly 70A and the distal end of rod 88 of second wheel lock assembly 70B, respectively. Slides 62A, 62B of first section 20 are dimensioned and positioned to align with openings 188a, 188b in plate 186 of second section 150. Openings 188a, 188b are dimensioned to allow slides 62A, 62B to slide within openings 188a, 188b, respectively. The movement of first section 20 relative to second section 150 will be described in detail below.

Referring now to FIGS. 1-3, foot actuation assembly 110 of transfer carriage 10 is best seen. Foot actuation assembly 110 allows a user to selectively lock transfer carriage 10 in the first, collapsed configuration and the second, expanded configuration. Foot actuation assembly 110 generally includes a lower mounting bracket 112, a lower linkage 116, an upper mounting bracket 126 and an upper linkage 132.

Lower mounting bracket 112 is attached to a lower portion of vertical member 34 of first section 20. A hole (not shown) extends through mounting bracket 112. A pin 114 extends through the hole in lower mounting bracket 112.

Lower linkage 116 is rotatably attached to lower mounting bracket 112. Lower linkage 116 includes two (2) L-shaped links 118a, 118b. Each link 118a, 118b has a base portion and a leg portion. The leg portion of link 118a is disposed on one side of lower mounting bracket 112 and the leg portion of link 118b is disposed on the opposite side of lower mounting bracket 112. Pin 114 extends through the leg portions of links 118a, 118b to rotatably attach links 118a, 118b to lower mounting bracket 116.

A pin 122 attaches the upper ends of links 118a, 118b together. Links 118a, 118b are attached to lower mounting bracket 112 such that the base portion of links 118a, 118b extend below bottom member 32. As shown in FIG. 3, a pedal 124 is disposed on the end of the base portions of links 118a, 118b. Pedal 124 is a generally rectangular shaped element.

Upper mounting bracket 126 is attached to an upper portion of vertical member 34 of first section 20. A hole (not shown) extends through upper mounting bracket 126. A pin 128 extends through the hole in upper mounting bracket 126.

Upper linkage 132 is rotatably attached to upper mounting bracket 126. Upper linkage 132 includes two (2) elongated links 134a, 134b. Each link 134a, 134b includes an elongated slot 136 formed therein. Slots 136 are dimensioned and positioned as described in detail below. A first end of link 134a is disposed to one side of upper mounting bracket 126. A first end of link 134b is disposed to the opposite side of upper mounting bracket 126. Pin 128 extends through links 134a, 134b to rotatably attach links 134a, 134b to upper mounting bracket 126. A pin 138 connects the second ends of links 134a, 134b together.

Lower linkage 116 is attached to upper linkage 132 such that pin 122 of lower linkage 116 is disposed within slots 136 in links 134a, 134b of upper linkage 132. Slots 136 and pin 122 are dimensioned to allow pin 122 to slide freely therein. Upper linkage 132 is attached to bracket 176 on receiving channel 172 of second section 150. Pin 138 of upper linkage 132 is disposed within slots 178 in legs 176a of bracket 176. Slots 178 are dimensioned to allow pin 138 to slide freely therein.

Lower linkage 116 is dimensioned such that, when pedal 124 moves in a downward direction, links 118a, 118b rotate about pin 114. As links 118a, 118b rotate, pin 122 in the upper ends of links 118a, 118b rotates in an upward direction. Pin 122 applies a force in an upward direction to slots 136 in upper linkage 132 thereby causing links 134a, 134b of upper linkage 132 to rotate about pin 128. In particular, the end of links 118a, 118b rotate upward such that pin 138 at the ends of links 118a, 118b moves in an upward direction within slots 178. When the user removes the force applied to pedal 124, upper linkage 132 and lower linkage 116 rotate in the opposite directions. As such, pin 138 at the ends of links 134a, 134b moves in a downward direction within slots 178.

Foot actuation assembly 110 is attached to transfer carriage 10 such that, when transfer carriage 10 is in the first collapsed configuration, pin 138 of upper linkage 132 is disposed in first notch 182 in bracket 176. When transfer carriage 10 is disposed in the second, expanded configuration, pin 138 of upper linkage 132 is disposed in second notch 184.

Figure 14:
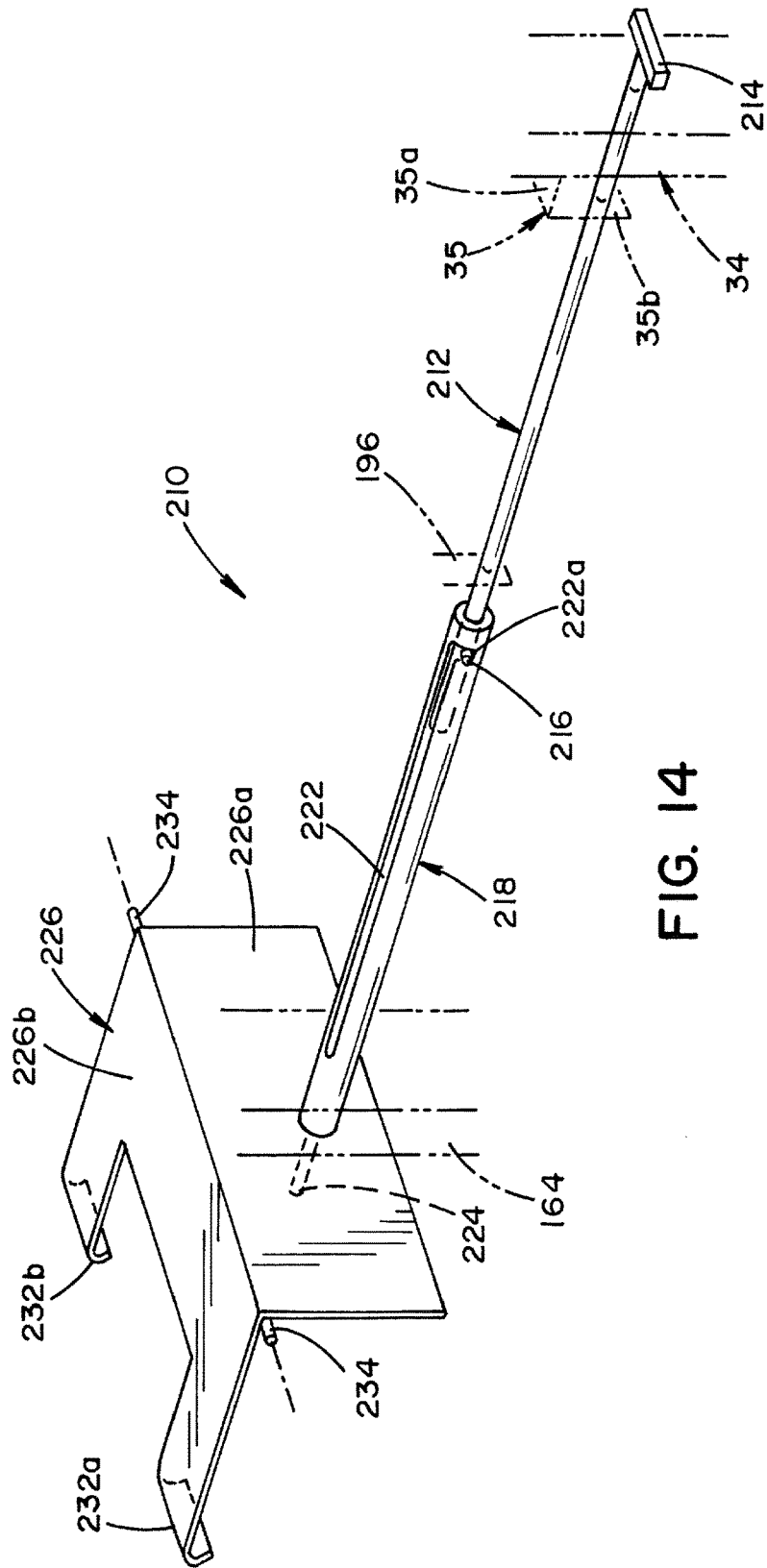
FIG. 14 is a perspective view of an attachment assembly of the present invention for securing and releasing a transfer carriage to and from a washer or sterilizer.

Referring to FIG. 14, attachment assembly 210 of transfer carriage 10 is best seen. Attachment assembly 210 is attached to an upper portion of first section 20 and an upper portion of second section 150. Attachment assembly 210 allows a user to selectively lock and unlock transfer carriage 10 to washer or sterilizer 4. Attachment assembly 210, in general, includes a rod 212, a sleeve 218 and a bracket 226.

Rod 212 is an elongated element having a handle 214 disposed at one end thereof. A pin 216 extends outwardly in a radial direction to form an outer wall of rod 212 near a distal end of rod 212.

Sleeve 218 is dimensioned to receive the distal end of rod 212. Sleeve 218 is a tubular-shaped element having a slot 222 formed therein. Slot 222 extends along a longitudinal axis of sleeve 218 and includes a notch 222a formed near a first end of sleeve 218. A pin 224 extends outwardly in an axial direction from the second end of sleeve 218.

Bracket 226 is attached to pin 224 of sleeve 218. Bracket 226 is a generally L-shaped element having a vertical portion 226a and a horizontal portion 226b. A hole (not shown) extends through vertical portion 226a. Horizontal portion 226b of bracket 226 includes two (2) hook portions 232a, 232b that extend from opposite ends of horizontal portion 226b. The distal end of each hook portion 232a, 232b is curved. A rod 234 is disposed at the corner of bracket 226 where vertical portion 226a meets horizontal portion 226b.

Pin 216 of rod 212 is dimensioned to be received into slot 222 of sleeve 218. Sleeve 218 is dimensioned such that rod 212 may slide freely within sleeve 218. Pin 224 of sleeve 218 is dimensioned to extend through the hole in vertical portion 226a of bracket 226.

Referring now to FIG. 14, attachment assembly 210 is attached to first section 20 and second section 150 of transfer carriage 10. First section 20 and second section 150 are shown with phantom lines in FIG. 14. The hole in the upper end of vertical member 34, is dimensioned such that rod 212 of attachment assembly 210 can slide freely therethrough. As shown in FIG. 14, handle 214 on rod 212 is disposed towards an outside of transfer carriage 10. Rod 212 of attachment assembly 210 extends through the hole in vertical portion 35b of bracket 35 and the hole in tab 196. As such, the holes in vertical member 34, bracket 35 and tab 196 are dimensioned and positioned to align with each other. Moreover, the holes in vertical member 34, bracket 35 and tab 196 are dimensioned such that rod 212 slides freely therethrough.

Bracket 226 of attachment assembly 210 is rotatably attached to an end of plate 186. Plate 186 includes tabs (not shown) that are dimensioned to receive rod 234 of attachment assembly 210. As such, bracket 226 is able to rotate relative to plate 186.

Attachment assembly 210 is attached to transfer carriage 10 such that, when transfer carriage 10 is in the first, collapsed configuration (shown in FIG. 1), pin 216 is disposed in slot 222 at the end opposite to notch 222a of slot 222. When transfer carriage 10 is in the second, expanded configuration (shown in FIGS. 2 and 14), pin 216 of rod 212 aligns with notch 222a in sleeve 218.

In summary, FIG. 1 shows transfer carriage 10 in the first, collapsed configuration. In this configuration, beam member 42 of first section 20 is disposed within receiving channel 172 of second section 150 such that pin 44 on beam member 42 is disposed at the end of slot 172c that is near the first end 172a of receiving channel 172. Pin 138 of upper linkage 132 is disposed in first notch 182 in slot 178 of C-shaped bracket 176. Rod 212 of attachment assembly 210 is disposed within sleeve 218 such that pin 216 on rod 212 is disposed at an end of slot 222 in sleeve 218 opposite notch 222a. Furthermore, tabs 192a, 192b on plate 186 of second section 150 engage the distal ends of rods 88 of first wheel locking assembly 70A and second wheel locking assembly 70B, respectively. As shown in FIG. 12, each tab 192a, 192b engages the end of plate 186 such that the distal end of rod 88 does not extend beyond first wall 73a of housing 72 of first wheel lock assembly 70A and pin 82 is in the unlocked position. As such, the distal end of each pin 82 is disposed at or below the upper surface of bottom wall 54 of each end rail 52.

To move transfer carriage 10 from the first, collapsed configuration, to the second, expanded configuration, a user applies a downward force to pedal 124 to cause lower linkage 116 of foot actuation assembly 110 to rotate. As described in detail above, when lower linkage rotates 116, the end of upper linkage 132 having pin 138 rotates in an upward direction. As such, pin 138 is lifted out of first notch 182 of C-shaped bracket 176. Transfer carriage 10 is now free to expand to the second, expanded configuration.

As first section 20 moves relative to second section 150, pin 44 of beam member 42 slides within slot 172c of receiving channel 172. Similarly, pin 138 of upper linkage 132 slides within slot 178 in C-shaped bracket 176 attached to a top of receiving channel 172. Pin 216 on rod 212 of attachment assembly 210 slides within slot 222 in sleeve 218. Moreover, tabs 192a, 192b of plate 186 move away from rods 88 of wheel lock assemblies 70A, 70B. As tabs 192a, 192b disengage from the distal ends of rods 88, biasing elements 86 are free to force pins 82 into the locked position, as shown in FIG. 13.

Once pin 44 of beam member 42 reaches an end of slot 172c of receiving channel 172, transfer carriage 10 is in the second, expanded configuration. Pin 138 of upper linkage 132 then falls into second notch 184 in the end of slot 178 to lock transfer carriage 10 into the second, expanded configuration. Pin 216 of rod 212 of attachment assembly 210 aligns with notch 222a and is free to rotate into notch 222a in slot 222.

FIG. 2 shows transfer carriage 10 in the second, expanded configuration. In this configuration, beam member 42 of first section 20 is disposed within receiving channel 172 of second section 150 such that pin 44 on beam member 42 is disposed at the end of slot 172c that is near second end 172b of receiving channel 172. Pin 138 of upper linkage 132 is disposed in second notch 184 in slot 178 of C-shaped bracket 176. Rod 212 of attachment assembly 210 is disposed within sleeve 218 such that pin 216 on rod 212 is disposed in notch 222a. Moreover, tabs 192a, 192b on plate 186 of second section 150 are spaced from rods 88 such that the distal end of rods 88 extend beyond the side wall of housings 72 of first and wheel lock assemblies 70A, 70B. As discussed in detail above, when rods 88 are in the second position, pins 82 are in the locked position. As such, the distal ends of each pins 82 extend above the upper surface of bottom walls 54 of each end rail 52A, 52B, as shown in FIG. 13.

Figure 4:
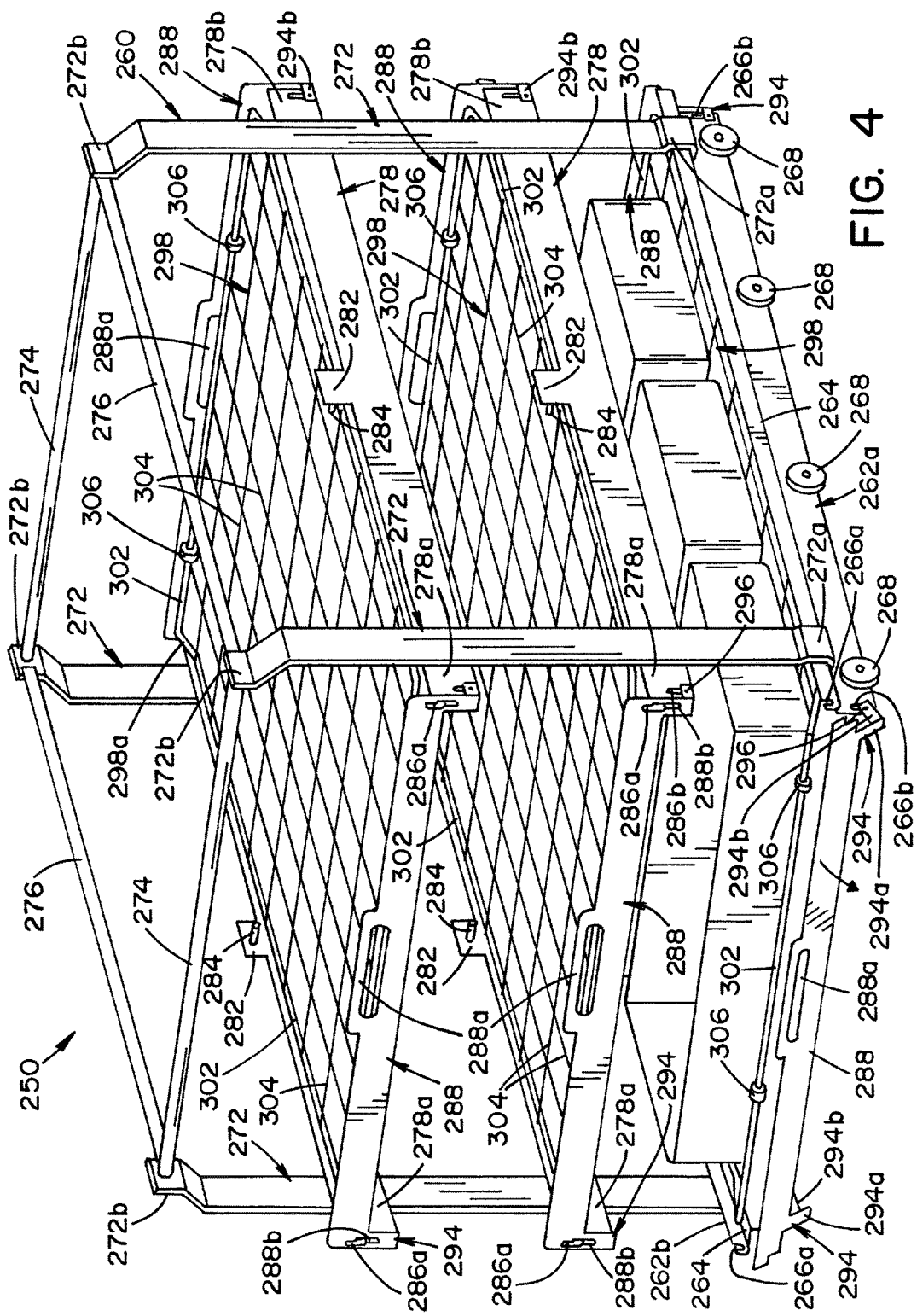
FIG. 4 is a perspective view of a device cart, illustrating a preferred embodiment of the present invention.

As noted above, transfer carriage 10 is dimensioned to receive device cart 250 thereon. As best seen in FIG. 4, device cart 250 is a generally rectangular-shaped structure that includes a frame assembly 260 and a plurality of racks 298.

Frame assembly 260, in general, includes side base rails 262a, 262b, vertical braces 272, end rods 274, side bars 276 and side rails 278.

Side base rails 262a, 262b extend along opposite sides of frame assembly 260. Side base rails 262a, 262b are essentially mirror images of each other. Therefore, only side base rail 262a will be described in detail. Side base rail 262a is a generally elongated plate-shaped element. An upper portion of side base rail 262a is formed to define a ledge 264. A notch 266a is formed in a top edge of side base rail 262a near each end thereof. Notch 266a is dimensioned and positioned as described in detail below. A vertical slot 266b is formed in side base rail 262a near each end thereof. Vertical slot 266b is dimensioned and positioned as described in detail below. Side base rails 262a, 262b define a lower shelf of device cart 250. It is contemplated that support plates or bars (not shown) may extend between side base rails 262a, 262b to provide stiffness to frame assembly 260.

A plurality of wheels 268 are attached to an outer surface of side base rails 262a, 262b. Wheels 268 aid a user in moving device cart 250 along a surface.

One (1) vertical brace 272 extends upward from each end of side base rails 262a, 262b. Each vertical brace 272 defines a corner of device cart 250. A lower end 272a of each vertical brace 272 is formed to attach to an upper edge of a corresponding side base rail 262a, 262b. An upper end 272b of each vertical brace 272 is bent inwardly to define a tab portion of each vertical brace 272.

One (1) end rod 274 extends between the tab portion of adjacent vertical braces 272 at each end of device cart 250. End rods 274 define the upper edges of the front end and the back end of device cart 250.

One (1) side bar 276 extends between the tab portion of adjacent vertical braces 272 along each side of device cart 250. Side bars 276 define the upper edges of the sides of device cart 250.

Side rails 278 extend along opposite sides of device cart 250 to define the shelves of cart 250. Each side rail 278 is generally an elongated plate-shaped element having a first end 278a and a second end 278b. An upper edge of each side rail 278 is formed to define a ledge (not shown). A tab 282 extends upwardly from an upper edge of each side rail 278 near a mid portion thereof. A stop pin 284 extends inwardly from each tab 282. A notch 286a is formed in a top edge of side rail 278 at first end 278a and second end 278b of side rail 278. Notch 286a is dimensioned and positioned as described in detail below. A vertical slot 286b is formed in each side rail 278 near first end 278a and second end 278b of side rail 278. Vertical slot 286b is dimensioned and positioned as described in detail below.

Side rails 278 are attached to vertical braces 272 such that a pair of side rails 278 on opposite sides of device cart 250 are aligned and define a shelf of device cart 250. In the embodiment shown, device cart 250 includes two (2) shelves. It is contemplated that side rails 278 may be fixed relative to vertical braces 272 to define permanent shelves of device cart 250 or movable relative to vertical braces 272 to define adjustable shelves of device cart 250.

A gate 288 is attached to sides rails 278 for each shelf of cart 250. Gate 288 is generally a plate-shaped element. A handle 288a is formed in an upper edge of gate 288 near a mid portion thereof. An L-shape leg 294 extends from a lower portion of gate 288 at each end thereof. A vertical portion 294a of leg 294 extends downwardly from the end of gate 288. A base portion 294b of leg 294 extends in a direction generally perpendicular to a surface of gate 288 toward a center portion of device cart 250. A pin 296 extends from each base portion 294b of leg 294. Pin 296 is dimensioned and positioned as described in detail below. A slot 288b is formed near each end of gate 288. Slots 288b are dimensioned and positioned as described in detail below.

One (1) gate 288 is attached to an end of each shelf of device cart 250. Slots 266b in side base rails 262a, 262b and slots 286b in side rails 278 are dimensioned such that one pin 296 extends into a corresponding slot 266b, slot 286b and freely slides therein. Each gate 288 is moveable between a closed position and an open position.

In the closed position (illustrated by the upper two (2) gates 288 in FIG. 4), gate 288 is in a generally vertical orientation such that a portion of side rail 278 extends through slot 288b of gate 288 and gate 288 rests in notch 286a of a corresponding of side rail 278. As such, gate 288 is captured by the ends of corresponding side rails 278. To move gate 288 to the open position, gate 288 is moved in an upward direction such that pin 296 slides in an upward direction in a corresponding slot 286b until slot 288b of gate 288 will clear the end of the corresponding side rail 278 when gate 288 is rotated away from side rail 278.

In the open position (illustrated by the lower gate 288 in FIG. 4), gate 288 is rotated at an angle such that handle 288a of gate is disposed below ledges 264 formed in the upper end of side base rails 262a, 262b. It is contemplated that gate 288 may be rotated until the surface of gate 288 is substantially parallel with ledges 264 of side base rails 262a, 262b.

One (1) wire rack 298 is disposed on each shelf of device cart 250. Each wire rack 298 includes a rectangular wire frame 302 having a plurality of crossing wires 304 defining a surface of wire rack 298. The surface of wire rack 298 receives containers or objects to be washed. Rubber pads 306 are disposed on each end of wire rack 298. In the embodiment shown, two (2) rubber pads 306 are disposed on each end wire of wire rack 298. Wire rack 298 is dimensioned to rest on the ledges of the respective shelf and to slide thereon. An end portion of wire rack 298 is formed to define a sloped portion 298a of wire rack 298. Slope portion 298a is slightly angled upwardly relative to the surface of wire rack 298.

Stop pin 284 is positioned and dimensioned such that slope portion 298a of wire rack 298 engages stop pin 284 when slope portion 298a is disposed below stop pin 284. As such, stop pin 284 stops wire rack 298 from being withdrawn from device cart 250. To remove wire rack 288 fully from device cart 250, the user must slightly rotate wire rack 298 until sloped portion 298a can slide under stop pins 284 of the respective shelf.

Operation

Figure 5:
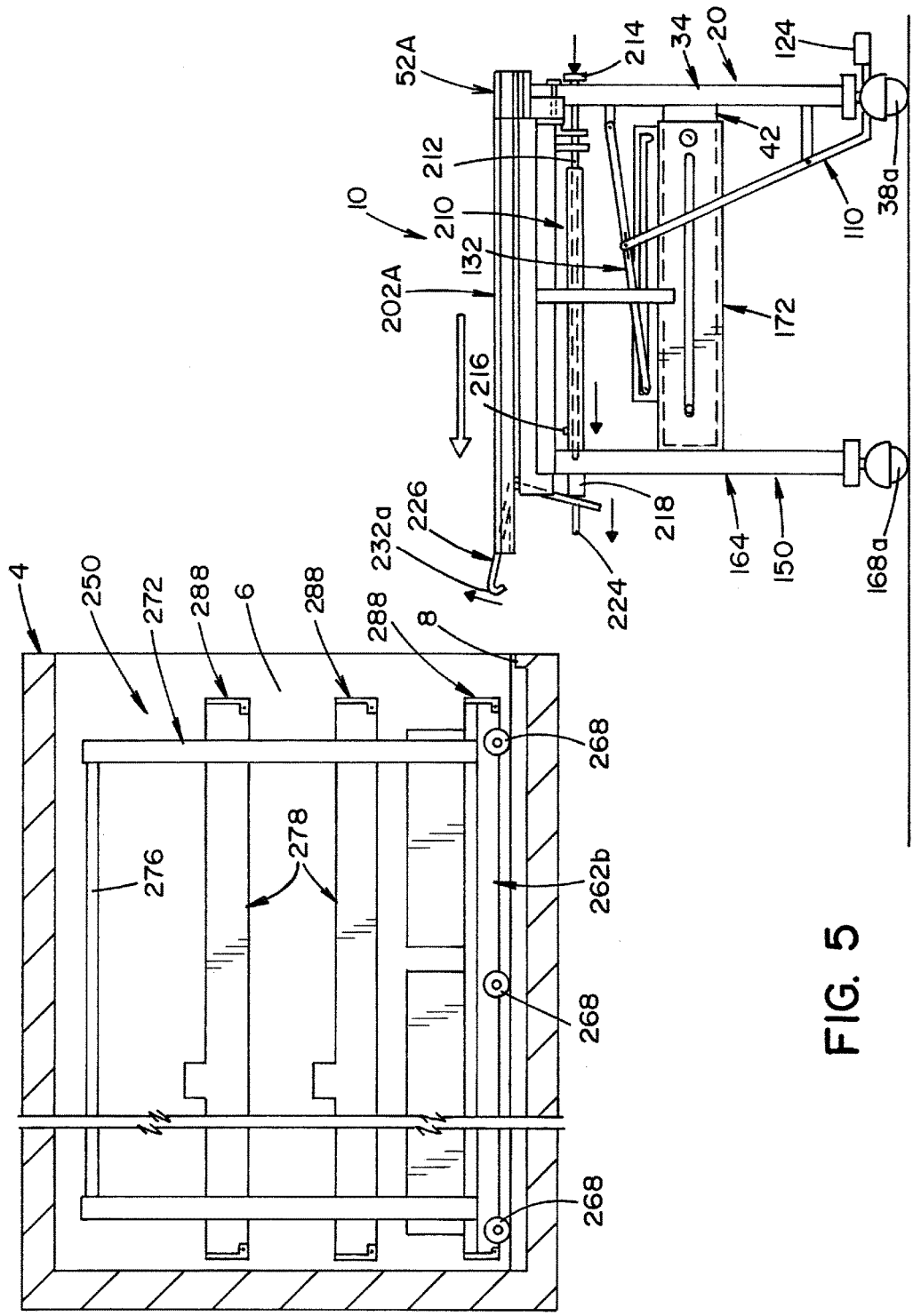
FIG. 5 is a side, elevation view of the transfer carriage shown in FIG. 1, illustrating the transfer carriage approaching a washer or sterilizer.

The present invention will now be described with respect to the operation of transfer carriage 10. Referring now to FIGS. 5-11, the operation of the present invention is best seen. FIG. 5 shows device cart 250 disposed within a chamber 6 of a conventional washer or sterilizer 4. Transfer carriage 10 is shown in the first, collapsed configuration.

As transfer carriage 10 approaches washer or sterilizer 4, the user pushes handle 214 on the end of rod 212 of attachment assembly 210. As described in detail above, transfer carriage 10 is in the first, collapsed position such that pin 216 of rod 212 is disposed at the end of slot 222 in sleeve 218 that is opposite notch 222a. The force applied by the user to handle 214 is transfer by pin 216 of rod 212 to sleeve 218. Sleeve 218, in turn, causes bracket 226 to rotate thereby making hook portions 232a, 232b move in an upward direction, as illustrated in FIG. 5.

Figure 6:
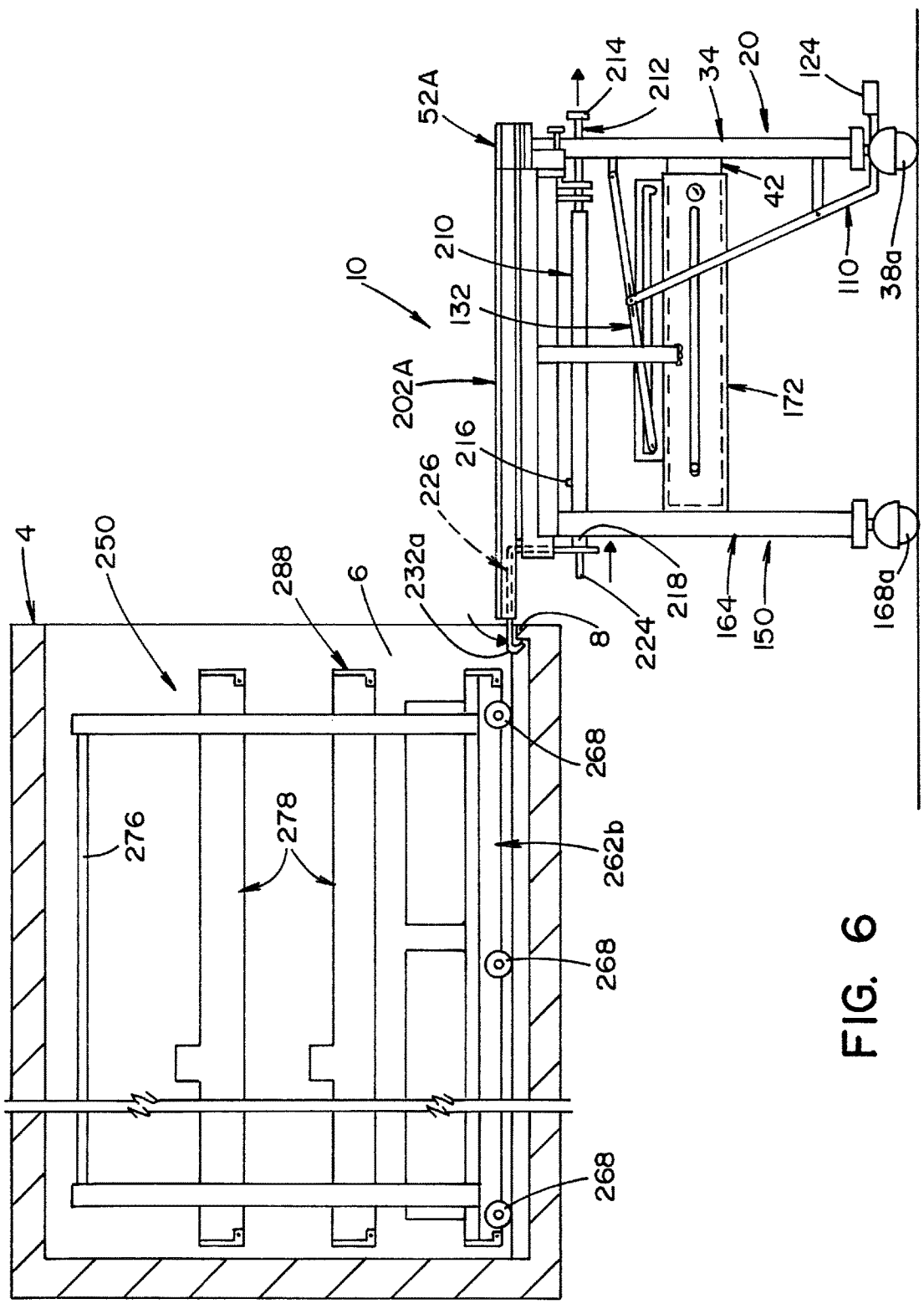
FIG. 6 is a side, elevation view of the transfer carriage shown in FIG. 1, illustrating an attachment assembly of the transfer carriage securing the transfer carriage to a housing of a washer or sterilizer.

The user then moves transfer carriage 10 such that hook portions 232a, 232b align with a lip 8 of washer or sterilizer 4. As shown in FIG. 6, when the user ceases to apply a force to handle 214, the weight of bracket 226 causes hook portions 232a, 232b to move in a downward direction. Hook portions 232a, 232b are dimensioned and positioned to engage lip 8 on washer or sterilizer 4 for securing transfer carriage 10 to washer or sterilizer 4.

Figure 7:
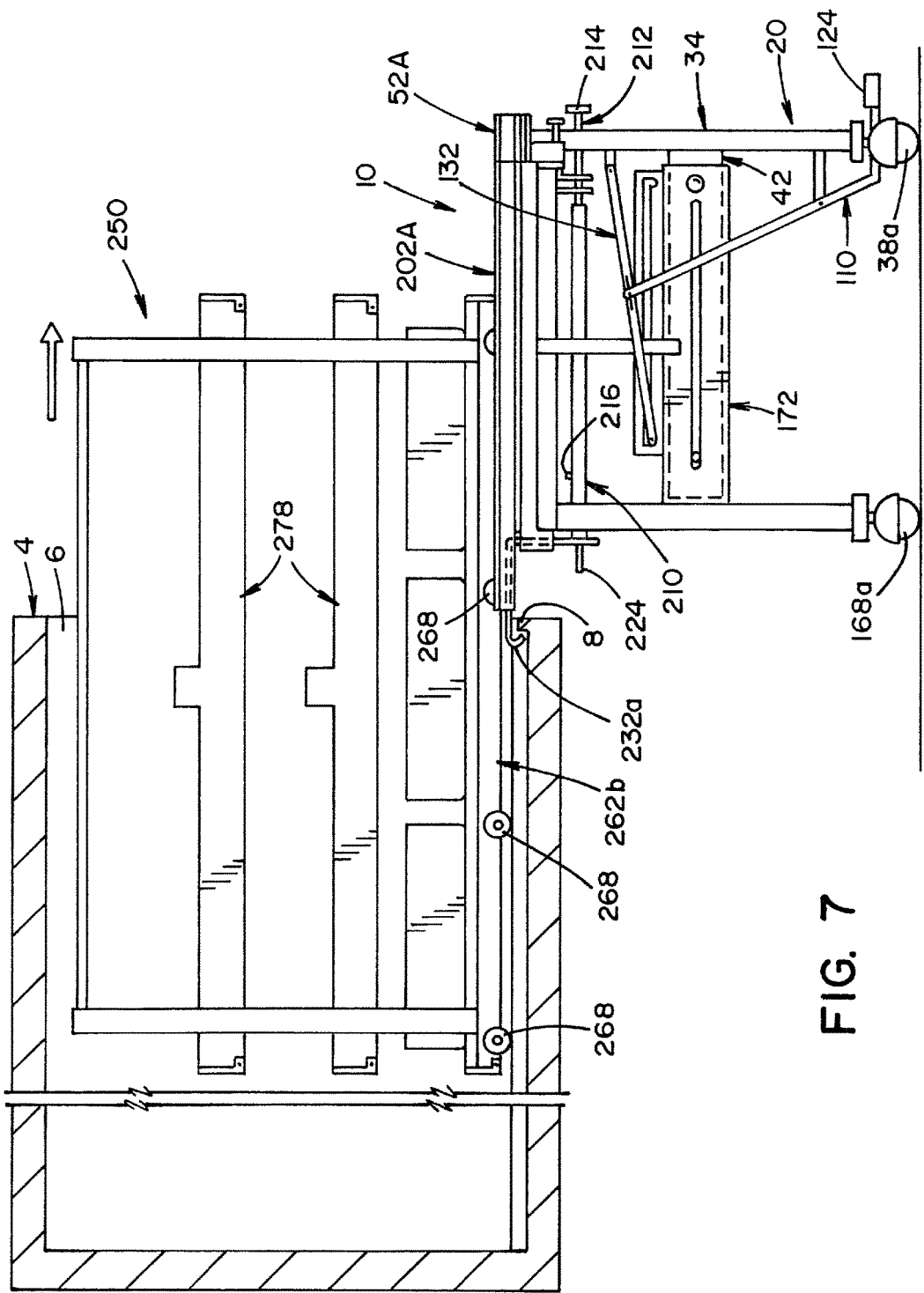
FIG. 7 is a side, elevation view of the transfer carriage shown in FIG. 1, illustrating a device cart being removed from a chamber and placed onto the transfer carriage.

Referring now to FIG. 7, once transfer carriage 10 is secured to washer or sterilizer 4, user withdraws device cart 250 from chamber 6 of washer or sterilizer 4. As device cart 250 is withdrawn from chamber 6, wheels 268 of device cart 250 roll onto side rails 202A, 202B of second section 150. It is contemplated that flanges 206a on side walls 206 of side rails 202A, 202B may be dimensioned to engage a mating flange (not shown) on device cart 250 such that device cart 250 is secured to transfer carriage 10.

The user withdraws device cart 250 until wheels 268 at one end of device cart 250 are disposed on end rails 52A, 52B of first section 20. In particular, as shown in FIG. 12, the front wheels 268 of device cart 250 are disposed between hole 54c in bottom wall 54 of end rails 52A, 52B and end walls 58 of end rails 52A, 52B.

Figure 8:
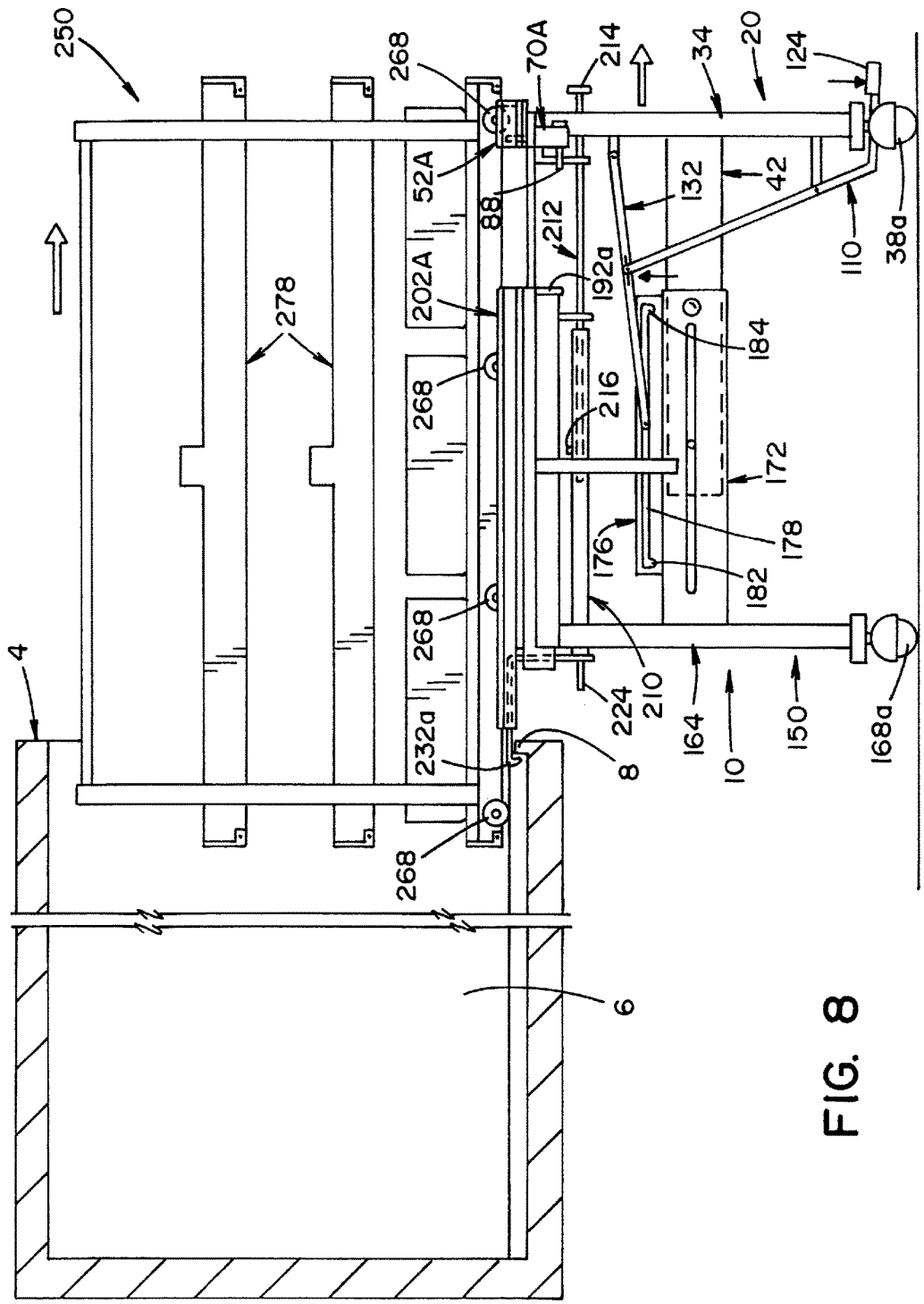
FIG. 8 is a side, elevation view of the transfer carriage of FIG. 7, illustrating the transfer carriage moving from a first, collapsed configuration to a second, expanded configuration while simultaneously withdrawing the device cart from the chamber of the washer or sterilizer.

Once device cart 250 is in the position shown in FIG. 12, the user actuates foot actuation assembly 110. As shown in FIG. 8, when foot actuation assembly 110 is actuated, pin 122 of lower linkage 116 causes upper linkage 132 to rotate. Pin 138 in upper linkage 132 lifts out of first notch 182 in slot 178 such that pin 138 is free to slide in slot 178. The user is then free to move first section 20 relative to second section 150. Since hook portions 232a, 232b secure second section 150 to washer or sterilizer 4, first section 20 moves in a telescoping manner away from second section 150.

As shown in FIG. 13, once tabs 192a, 192b disengage from the distal ends of rods 88, biasing element 86 causes pin 82 to extend above a surface of bottom wall 54 of end rails 52A, 52B such that wheels 268 of device cart 250 are locked to first section 20. As shown in FIG. 8, as the user continues to move first section 20 away from second section 150, device cart 250 is simultaneously withdrawn from chamber 6 of washer or sterilizer 4. The present invention thus provides an apparatus wherein the user does not have to lift device cart 250 to place device cart 250 on transfer carriage 10.

Figure 9:
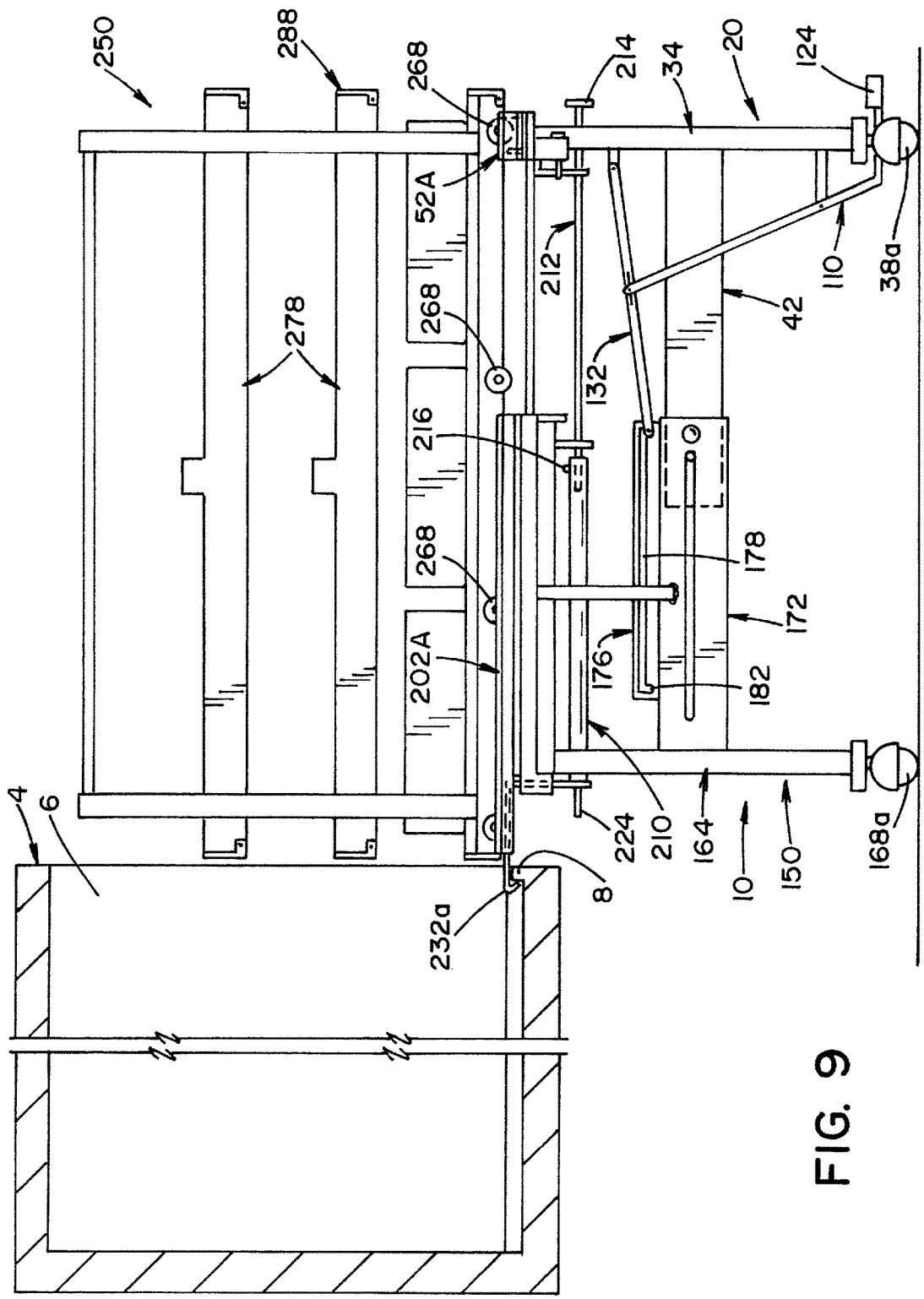
FIG. 9 is a side, elevation view of the transfer carriage of FIG. 7, illustrating the transfer carriage in a second, expanded configuration and the device cart fully disposed on the transfer carriage.

The user continues to expand transfer carriage 10 to the second, expanded configuration until device cart 250 is fully disposed on transfer carriage 10. As shown in FIG. 9, once transfer carriage 10 is in the second, expanded configuration, pin 138 in upper linkage 132 aligns with second notch 184 in slot 178. The weight of upper linkage 132 causes pin 138 to fall into second notch 184 thereby locking transfer carriage 10 into the second, expanded configuration.

Figure 10:
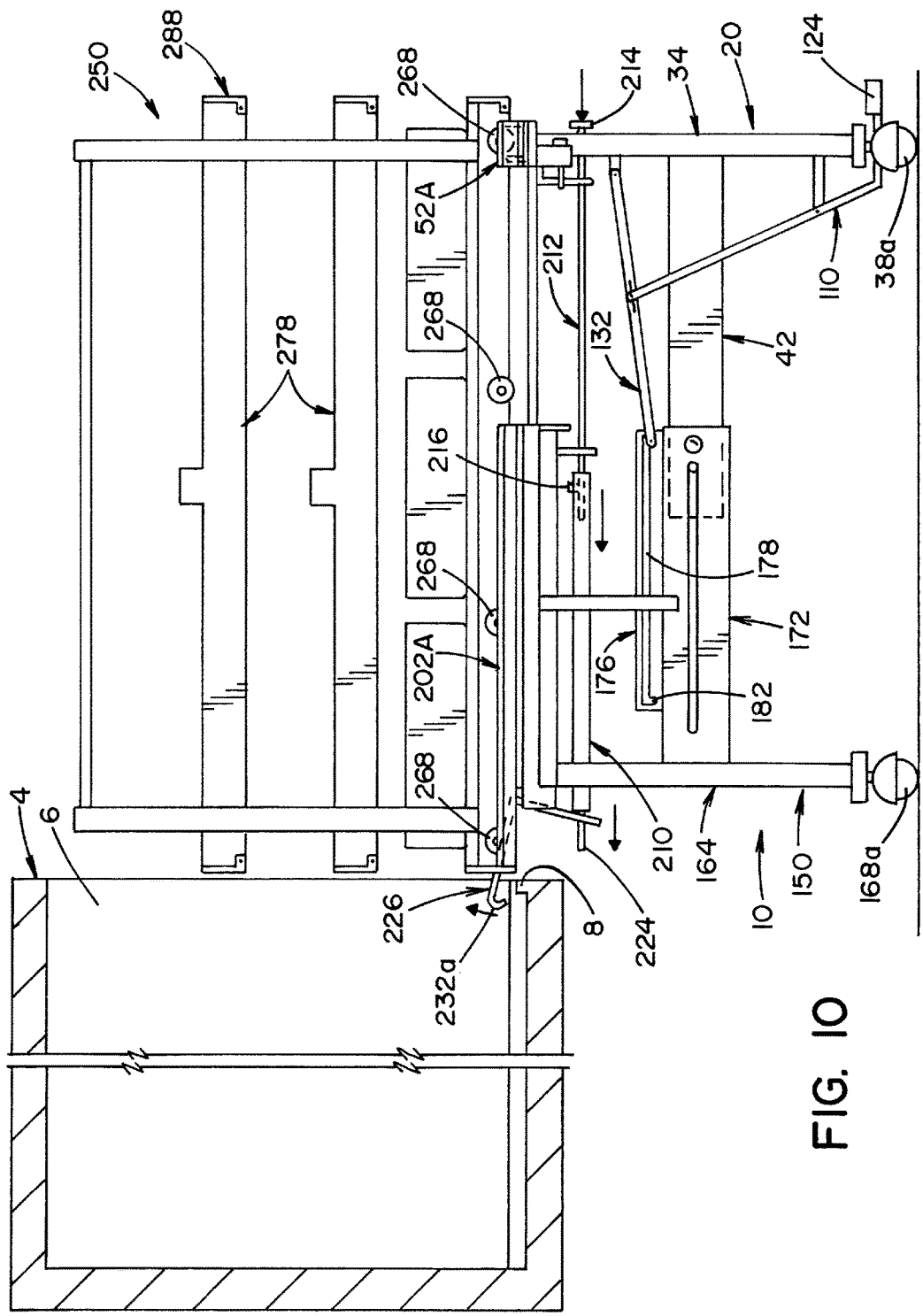
FIG. 10 is a side, elevation view of the transfer carriage of FIG. 9, illustrating actuation of the attachment assembly of the transfer carriage for releasing the transfer carriage from the washer or sterilizer.
Figure 11:
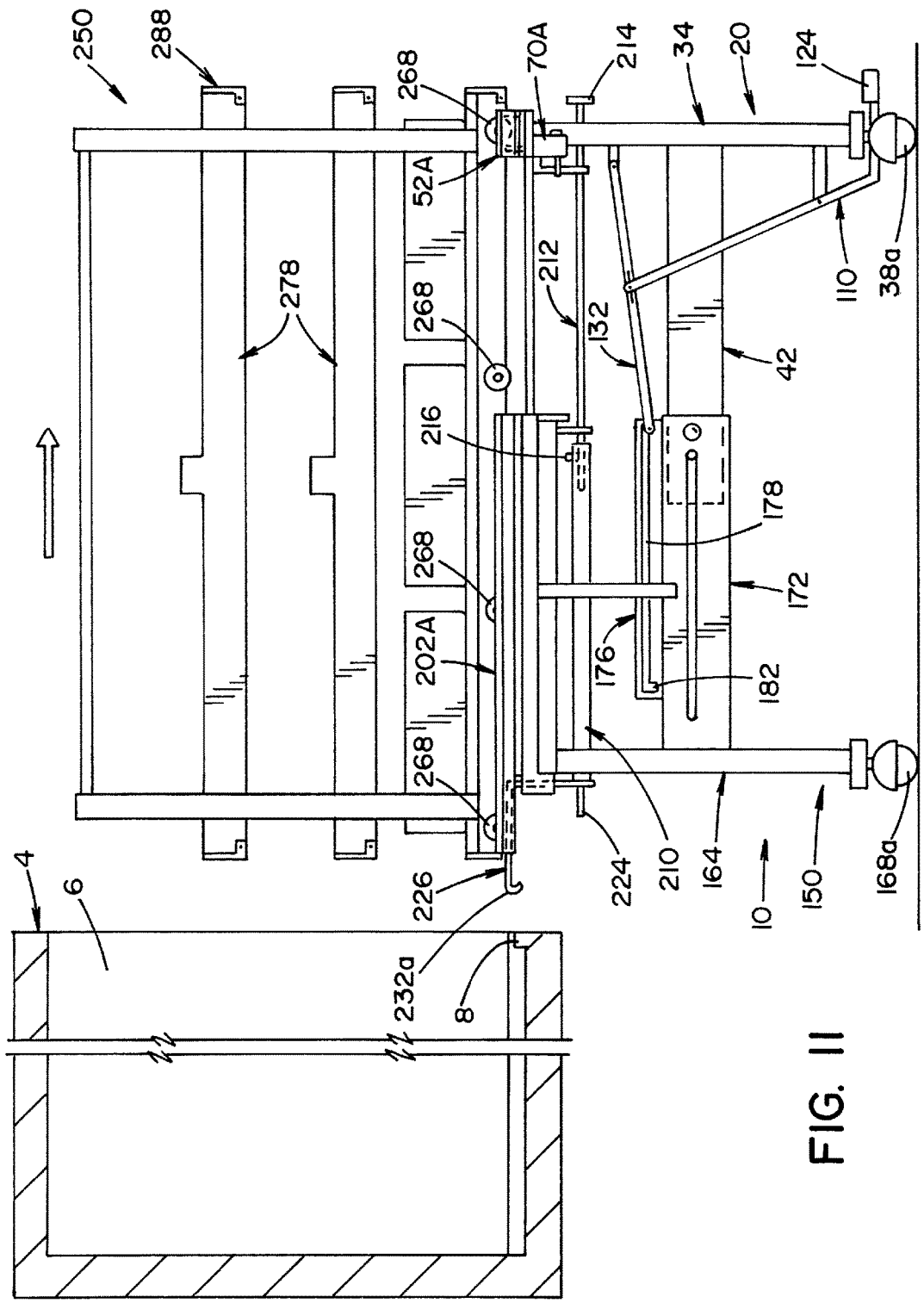
FIG. 11 is a side, elevation view of the transfer carriage of FIG. 10, illustrating the transfer carriage moving away from the washer or sterilizer.

The user then rotates handle 214 of attachment assembly 210 such that pin 216 moves into notch 222a in slot 222 of sleeve 218. Once pin 216 is in notch 222a, the user may push on handle 214 of attachment assembly 210. As shown in FIG. 10, the force applied by the user to handle 214 is transferred by pin 216 to sleeve 218. Sleeve 218, in turn, causes bracket 226 to rotate such that hook portions 232a, 232b no longer engage lip 8 of washer or sterilizer 4. The user is then free to move transfer carriage 10 and device cart 250 away from washer or sterilizer 4 and to a desired location.

The insertion of device cart 250 into washer or sterilizer 4 is done in the reverse manner described above. In particular, a user first attaches transfer carriage 10 to washer or sterilizer 4 using hook portions 232a, 232b of attachment assembly 210. The user actuates foot actuation assembly 110 such that pin 138 of upper linkage 132 is lifted out of second notch 184. A force is applied to first section 20 such that first section 20 moves toward second section 150. As first section 20 moves toward second section 150, device cart 250 is inserted into chamber 6 of washer or sterilizer 4. Once transfer carriage 10 is in the first, collapsed configuration, tabs 192a, 192b on second section 150 engages the distal ends of rods 88 and causes pins 82 to be withdrawn below the surface of bottom walls 54 of end rails 52A, 52B on first section 20. Pin 138 in upper linkage 132 also falls into first notch 182 to lock transfer carriage 10 in the first, collapsed configuration. The user is then free to push device cart 250 the remainder of the way into chamber 6 of washer or sterilizer 4. Once device cart 250 is fully inserted into chamber 8, the user pushes on handle 214 such that hook portions 232a, 232b of bracket 226 disengage from washer or sterilizer 4. The user is then free to move transfer carriage 10, while still in the first, collapsed configuration, to a desired location, e.g., a storage location.

The present invention thus provides an apparatus that aids a user in quickly and safely inserting and removing a device cart into and from a chamber of a washer or sterilizer. The apparatus is moveable between a first, collapsed configuration and a second, expanded configuration for aiding the user in inserting and removing the device cart into and from a washer or sterilizer. Moreover, the first, collapsed configuration of the present invention allows the user the ability to store the apparatus in a manner that requires little floor space as compared to full size transfer carriages.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A carriage for respectively inserting and removing a cart into and from a chamber of an apparatus, said carriage having a first, collapsed configuration and a second, expanded configuration, said carriage including:

a first section and a second section that are engaged with each other and configured to move relative to each other between said first, collapsed configuration and said second, expanded configuration, said first section comprising at least one cart locking device, said cart locking device comprising a locking pin and an end rail of said first section, said locking pin being configured to contact at least one of a plurality of wheels of said cart to lock said one of said plurality of wheels between said locking pin and said end rail when said cart is positioned on said first and second sections and said first and second sections are either in said second, expanded configuration or moving between said first, collapsed configured and said second, expanded configuration, said end rail comprising a bottom wall and an end wall; and an attachment assembly secured to said first and second sections, the attachment assembly being configured to engage said apparatus and selectively attach said first and second sections to said apparatus, wherein the bottom wall includes a hole formed therein, the hole being dimensioned to allow said locking pin to extend therethrough, and wherein, when said cart is positioned on said first and second sections, said locking pin extends through said hole and above a surface of said bottom wall to lock said one of said plurality of wheels between said locking pin and said end wall.

2. The carriage as defined in claim 1, further comprising:
at least one section locking device configured to selectively lock said first and second sections in said first, collapsed configuration and said second, expanded configuration.

3. The carriage as defined in claim 2, further comprising:
a foot pedal configured to actuate said at least one section locking device.

4. The carriage as defined in claim 1, wherein said first and second sections move relative to each other in a telescoping-like manner.

5. The carriage as defined in claim 1, wherein each of said first and second sections includes a rail for allowing said cart to slide thereon.

6. The carriage as defined in claim 1, wherein said cart includes:
a frame;
at least one removable wire shelf; and
at least one gate attached to said frame for securing said at least one removable shelf into said cart,
wherein said wheels are configured to engage said first and second sections.

7. The carriage as defined in claim 1, wherein said locked one of said plurality of wheels is locked between said locking pin and said end wall while being supported on said bottom wall.

8. A method for removing a cart from a chamber of an apparatus, said method including steps of:
providing a carriage configured to respectively insert and remove said cart into and from said chamber, said carriage having a first section and a second section that are engaged with each other and configured to move relative to each other in a telescopic manner between a minimized, first, collapsed configuration and a maximized, second, expanded configuration, said first section comprising at least one cart locking device, said cart locking device comprising a locking pin and an end rail of said first section, said end rail comprising a bottom wall and an end wall;
locking an attachment assembly secured to said first and second sections to said apparatus when said first and second sections are in said first, collapsed configuration;
partially withdrawing said cart from said chamber onto said first and second sections until one or more wheels of said cart reach an end wall of said first section while said first and second sections are positioned in said first, collapsed configuration; and
expanding said first and second sections from said first, collapsed configuration to said second, expanded configuration to fully withdraw said cart from said chamber onto said first and section sections, said expanding comprising contacting said wheels of said cart with said locking pin to lock said one of said plurality of wheels between said locking pin and said end rail while said first and second sections are moved between said first, collapsed configuration and said second, expanded configuration and when said first and second sections are in said second, expanded configuration,
wherein the bottom wall includes a hole formed therein, the hole being dimensioned to allow said locking pin to extend therethrough, and
wherein, when said cart is positioned on said first and second sections, said locking pin extends through said hole and above a surface of said bottom wall to lock said one of said plurality of wheels between said locking pin and said end wall.

9. A method as defined in claim 8, further comprising the step of unlocking said first and second sections from said apparatus.

10. A method as defined in claim 8, wherein said apparatus comprises a sterilizer.

11. A method as defined in claim 8, wherein said apparatus comprises a washer.

12. A carriage for respectively inserting and removing a cart into and from a chamber of an apparatus, said carriage having a first, collapsed configuration and a second, expanded configuration, said carriage including:
a first section and a second section that are engaged with each other and configured to move relative to each other between said first, collapsed configuration and said second, expanded configuration, said first section comprising at least one cart locking device, said cart locking device comprising a locking pin and an end rail of said first section, said locking pin being configured to contact at least one of a plurality of wheels of said cart to lock said one of said plurality of wheels between said locking pin and said end rail when said cart is positioned on said first and second sections, said end rail comprising a bottom wall and an end wall; and
an attachment assembly secured to said first and second sections, the attachment assembly being configured to engage said apparatus and selectively attach said first and second sections to said apparatus,
wherein the bottom wall includes a hole formed therein, the hole being dimensioned to allow said locking pin to extend therethrough, and
wherein, when said cart is positioned on said first and second sections, said locking pin extends through said hole and above a surface of said bottom wall to lock said one of said plurality of wheels between said locking pin and said end wall.

* * * * *